US012478132B2

(12) United States Patent
Bidal et al.

(10) Patent No.: US 12,478,132 B2
(45) Date of Patent: *Nov. 25, 2025

(54) GOLF SHOE SOLE WITH LOCALIZED SIDEWALLS REINFORCEMENT STRUCTURE

(71) Applicant: Acushnet Company, Fairhaven, MA (US)

(72) Inventors: Jean-Marie Bidal, Bridgewater, MA (US); Robert S. Bento, Raynham, MA (US)

(73) Assignee: ACUSHNET COMPANY, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/649,595

(22) Filed: Apr. 29, 2024

(65) Prior Publication Data

US 2024/0285026 A1   Aug. 29, 2024

Related U.S. Application Data

(63) Continuation of application No. 17/686,146, filed on Mar. 3, 2022, now Pat. No. 11,986,048.

(51) Int. Cl.
*A43B 13/14*    (2006.01)

(52) U.S. Cl.
CPC .................................. *A43B 13/14* (2013.01)

(58) Field of Classification Search
CPC ... A43B 13/026; A43B 13/125; A43B 13/127; A43B 13/14; A43B 13/42; A43B 7/1445; A43B 7/1495; A43B 5/001
See application file for complete search history.

(56) References Cited

U.S. PATENT DOCUMENTS

| | | | |
|---|---|---|---|
| 892,152 | A | 6/1908 | Harman |
| 4,268,981 | A | 5/1981 | Olivieri |
| 4,947,560 | A | 8/1990 | Fuerst |
| 5,692,319 | A | 12/1997 | Parker |
| 5,832,634 | A | 11/1998 | Wong |
| 5,845,420 | A | 12/1998 | Buccianti |
| 6,079,125 | A | 6/2000 | Quellais |
| 6,401,366 | B2 | 6/2002 | Foxen |
| 7,685,740 | B2 | 3/2010 | Sokolowski |
| 8,074,379 | B2 | 12/2011 | Robinson, Jr. |

(Continued)

*Primary Examiner* — Bao-Thieu L Nguyen
(74) *Attorney, Agent, or Firm* — Womble Bond Dickinson (US) LLP

(57) ABSTRACT

A golf shoe with a sole assembly having a sidewall reinforcement structure is provided. The reinforcement structure may be formed from a carbon composite or other reinforcing material. The reinforcement structure is molded into the sole assembly for reinforcing softer midsole sidewalls, and for providing increased stability and maintaining forefoot flexibility. The structure is generally U-shaped with a medial and lateral side wing and a bridge connecting the wings. The medial wing may be angled rearward to support the rearfoot, and the lateral wing may be angled forward to support the midfoot. Thus, the reinforcement structure may hold and support the medial and lateral sides of the golfer's foot as they shift their weight while making a golf shot. At the same time, the shoe has good flexibility so the golfer is able to walk and play the course and engage in other golf activities comfortably.

20 Claims, 16 Drawing Sheets

(56) References Cited

U.S. PATENT DOCUMENTS

| | | |
|---|---|---|
| 8,479,415 B2 | 7/2013 | Berger |
| 8,850,721 B2 | 10/2014 | Long |
| 9,549,589 B2 | 1/2017 | Auger |
| 9,743,709 B2 | 8/2017 | Hesterberg |
| 9,788,599 B2 | 10/2017 | Hesterberg |
| 9,861,162 B2 | 1/2018 | Kilgore |
| 10,681,957 B2 | 6/2020 | Duarte |
| 11,033,068 B2 | 6/2021 | Devoe |
| 11,638,461 B2 | 5/2023 | Hanat |
| 11,986,048 B2 * | 5/2024 | Bidal .................. A43B 13/14 |
| 2002/0092207 A1 | 7/2002 | Girard |
| 2011/0239486 A1 | 10/2011 | Berger |
| 2012/0324761 A1 | 12/2012 | Sills |
| 2013/0059116 A1 | 3/2013 | Peikert |
| 2015/0342300 A1 | 12/2015 | Cin |
| 2017/0340060 A1 | 11/2017 | Madore |
| 2018/0110285 A1 | 4/2018 | Cohen |
| 2020/0282290 A1 | 9/2020 | Smirman |
| 2020/0323309 A1 | 10/2020 | Hanat |
| 2021/0186150 A1 | 6/2021 | Truelsen |
| 2021/0315320 A1 | 10/2021 | Takamasu |

\* cited by examiner

BOTTOM VIEW

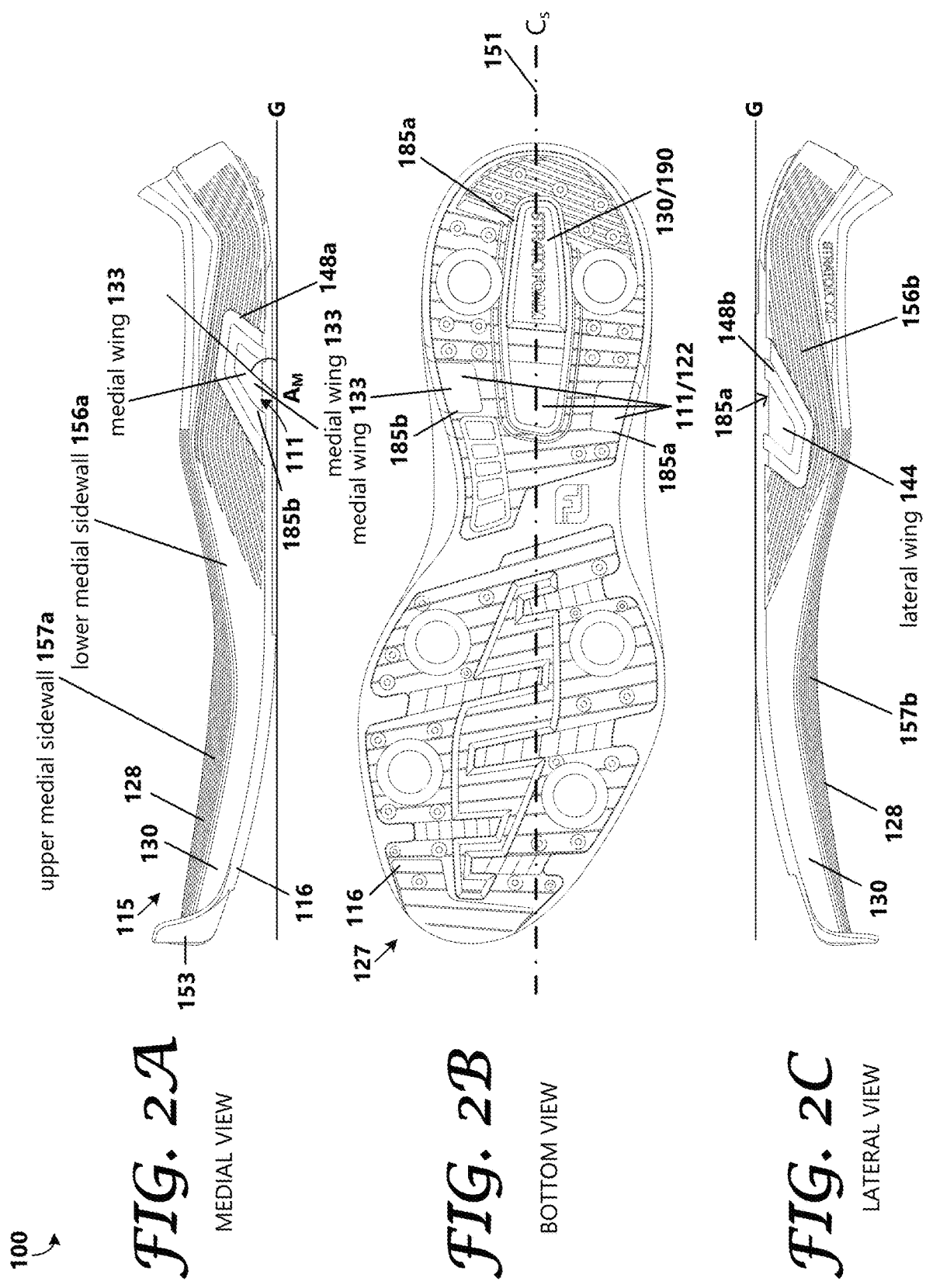

BOTTOM REAR PERSPECTIVE EXPLODED VIEW

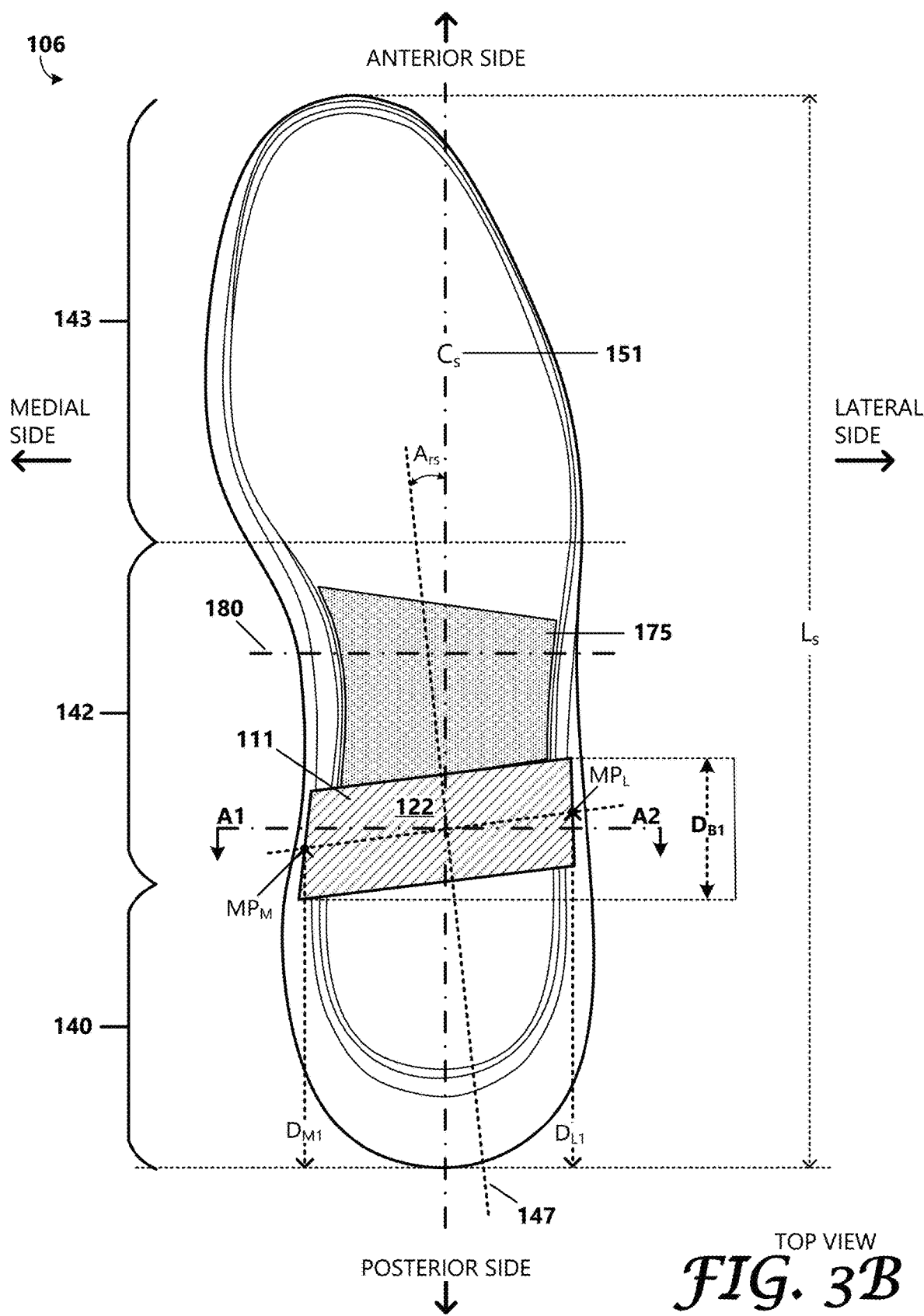
FIG. 3B TOP VIEW

SECTION A1-A2

BOTTOM VIEW

SECTION A1-A2

REAR VIEW

TOP VIEW

GOLF SHOE SOLE WITH LOCALIZED SIDEWALLS REINFORCEMENT STRUCTURE

CROSS-REFERENCE TO RELATED APPLICATIONS

This application is a continuation of U.S. patent application Ser. No. 17/686,146 filed Mar. 3, 2022, entitled "Golf Shoe Sole With Localized Sidewalls Reinforcement Structure," which is incorporated herein by reference in its entirety.

BACKGROUND

The sport of golf involves a variety of actions that a golfer may perform, such as a golf swing, walking a golf course, crouching down to line-up a putt, and other golfing actions. Having proper equipment when playing the sport of golf may be a factor in how well the golfer may be able to perform these actions. Golf shoes are one example piece of equipment that can affect a golfer's performance. For example, when a golfer swings a club and transfers their weight on their feet, there are high forces placed on the foot. The shoe needs to provide a stable platform for the golfer when he/she makes their swing, but the foot also needs to be able to flex to a certain degree. The bending of the shoe also is important when the golfer is walking, crouching down, and other golfing actions.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe a golf shoe comprising a sidewall reinforcement structure for reinforcing midsole sidewalls, and for providing increased stability and maintaining forefoot flexibility.

In an example, the technology relates to a golf shoe comprising: an upper; and a sole assembly connected to the upper, the upper and sole assembly each having forefoot, midfoot, and rearfoot areas, lateral and medial sides, and anterior and posterior ends, the sole assembly comprising: a U-shaped reinforcement structure, the reinforcement structure comprising: a lateral side wing that extends upward from a periphery of a lateral sidewall of the sole assembly; a medial side wing that extends upward from the periphery of a medial sidewall of the sole assembly; and a bridge section that extends from the lateral side wing to the medial side wing.

In another example, the technology relates to a U-shaped reinforcement structure for reinforcing a sole assembly of a golf shoe, the reinforcement structure comprising: a lateral side and a medial side; an anterior side and a posterior side; a bridge section; a lateral side wing that extends upward from a lateral side of the bridge section, wherein the lateral side wing is angled toward the posterior side of the reinforcement structure to support a rearfoot area of the sole assembly; and a medial side wing that extends upward from a medial side of the bridge section, wherein the medial side wing is angled toward the anterior side of the reinforcement structure to support a midfoot area of the sole assembly.

In another example, the technology relates to a method for making a golf shoe comprising a U-shaped reinforcement structure for reinforcing a sole assembly of a golf shoe: cutting a reinforcement structure from a sheet of reinforcing material; molding the reinforcement structure to form a U shape comprising: a bridge section having a lateral side and a medial side and an anterior end and a posterior end; a lateral side wing that extends upward from the lateral side of the bridge section and that is angled toward a posterior end of the reinforcement structure to support a rearfoot area of the sole assembly; and a medial side wing that extends upward from the medial side of the bridge section and that is angled toward the anterior end to support a midfoot area of the sole assembly; constructing a shoe upper; molding the reinforcement structure into a midsole or an outsole; assembling the midsole to the outsole; and attaching the midsole and outsole to the upper.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 2A depicts a medial side view of a sole of a golf shoe in which a reinforcement structure may be implemented according to an example.

FIG. 2B depicts a bottom view of the sole of FIG. 2A according to an example.

FIG. 2C depicts a lateral side view of the sole of FIG. 2A according to an example.

FIG. 3B depicts a top schematic view of a sole assembly of a golf shoe in which a reinforcement structure may be implemented according to an example.

DETAILED DESCRIPTION

Figure 1A:
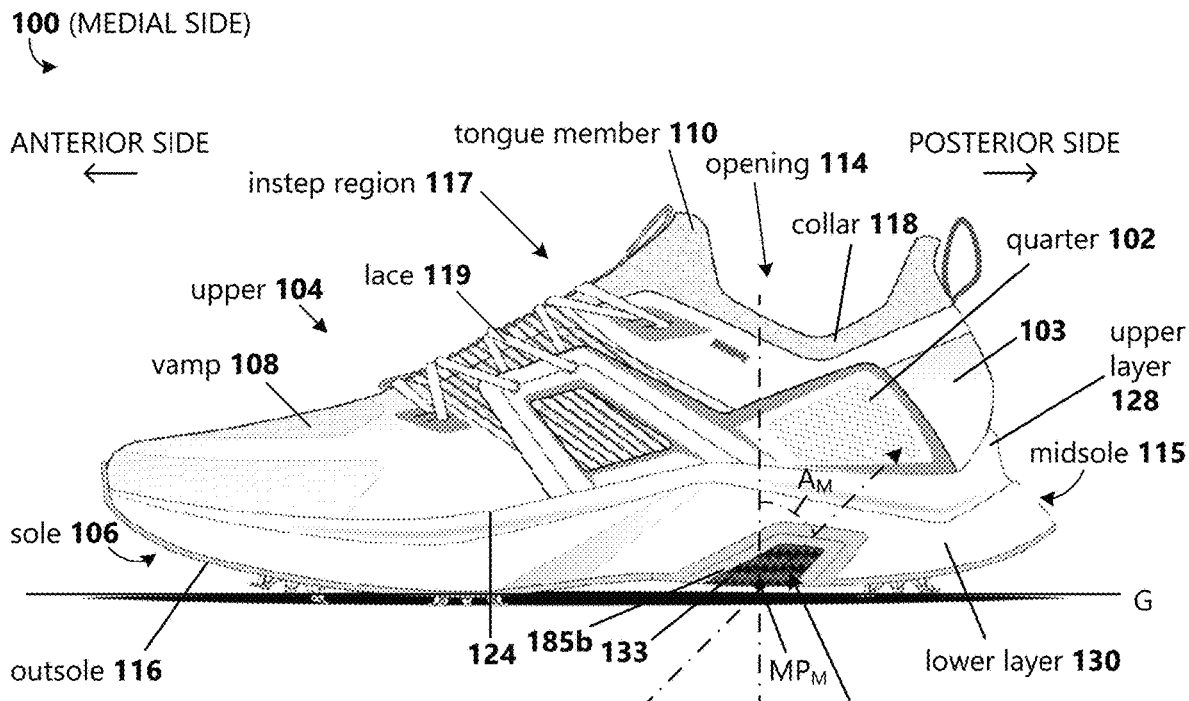
FIG. 1A depicts a medial side view of a golf shoe in which a reinforcement structure may be implemented according to an example.

The present technology now will be described more fully in reference to the accompanying figures, in which embodiments of the technology are shown. However, this technology should not be construed as limited to the embodiments set forth herein. Rather, these embodiments are provided so that this disclosure will be thorough and complete, and will fully convey the scope of the technology to those skilled in the art. In the drawings, like numbers refer to like elements throughout. Thicknesses and dimensions of some components may be exaggerated for clarity. The views shown in the Figures are of a right shoe and it is understood the components for a left shoe will be mirror images of the right shoe. It also should be understood that the shoe may be made in various sizes and thus the size of the components of the shoe may be adjusted depending upon the shoe size.

The terminology used herein is for the purpose of describing particular embodiments only and is not intended to be limiting of the technology. As used herein, the singular forms "a," "an," and "the" are intended to include the plural forms as well, unless the context clearly indicates otherwise.

It will be understood that when an element is referred to as being "attached," "coupled" or "connected" to another element, it can be directly attached, coupled or connected to the other element or intervening elements may also be present. In contrast, when an element is referred to as being "directly attached," directly coupled" or "directly connected" to another element, there are no intervening elements present.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present technology are explained in detail in the specification set forth below.

As briefly discussed above, when walking and playing golf, there are numerous and varied forces that may act on the foot and different parts of a golfer's shoe. For example, downward and upward forces can act on a midsole during a golf swing. Various features of a midsole that may be designed for increased cushioning and comfort, may also cause the midsole to be less rigid. Accordingly, increasing comfort of the shoe with a softer midsole may decrease an amount of support provided by the shoe when forces are applied; and alternatively, increasing the rigidity of the midsole may decrease the amount of cushioning, forefoot flex, and other comfort characteristics. One drawback with some athletic golf shoes is these shoes may help provide the golfer with good cushioning, forefoot flex, and other comfort characteristics; however, there may be a loss in rigidity of the midsole, which may not provide a stable platform for the golfer when he/she maker their swing. For example, a softer midsole may decrease the amount of support to prevent collapse of the shoe's suspension during a golf swing. Thus, there is a need for a golf shoe that can provide a high level of stability, such as that may be provided in a classic golf shoe having a rigid midsole designed for optimal stability, and yet also provide high flexibility, such as that may be provided in an athletic golf shoe that may have a midsole designed for optimal forefoot flex and underfoot cushioning/comfort.

To help alleviate the above problems, among other things, the examples of the present disclosure describe a golf shoe comprising a reinforcement structure. A sole of a shoe comprising the reinforcement structure may help provide additional stability. For example, the reinforcement structure may aid the shoe in being able to hold and support the medial and lateral sides of the golfer's foot as they shift their weight while making a golf shot. Thus, the golfer has a stable platform to drive power for a golf swing while being able to stay balanced during the follow through of the golf swing. The reinforcement structure may further provide greater bending stiffness in the midfoot area of the sole. For instance, the reinforcement structure may help provide the shoe with additional mechanical strength and structural integrity that does not allow excessive twisting or turning of the shoe. Thus, the shoe may provide improved torsional stability. At the same time, the shoe may retain forefoot flexibility so the golfer is able to walk and play the course and engage in other golf activities comfortably.

Figure 1B:
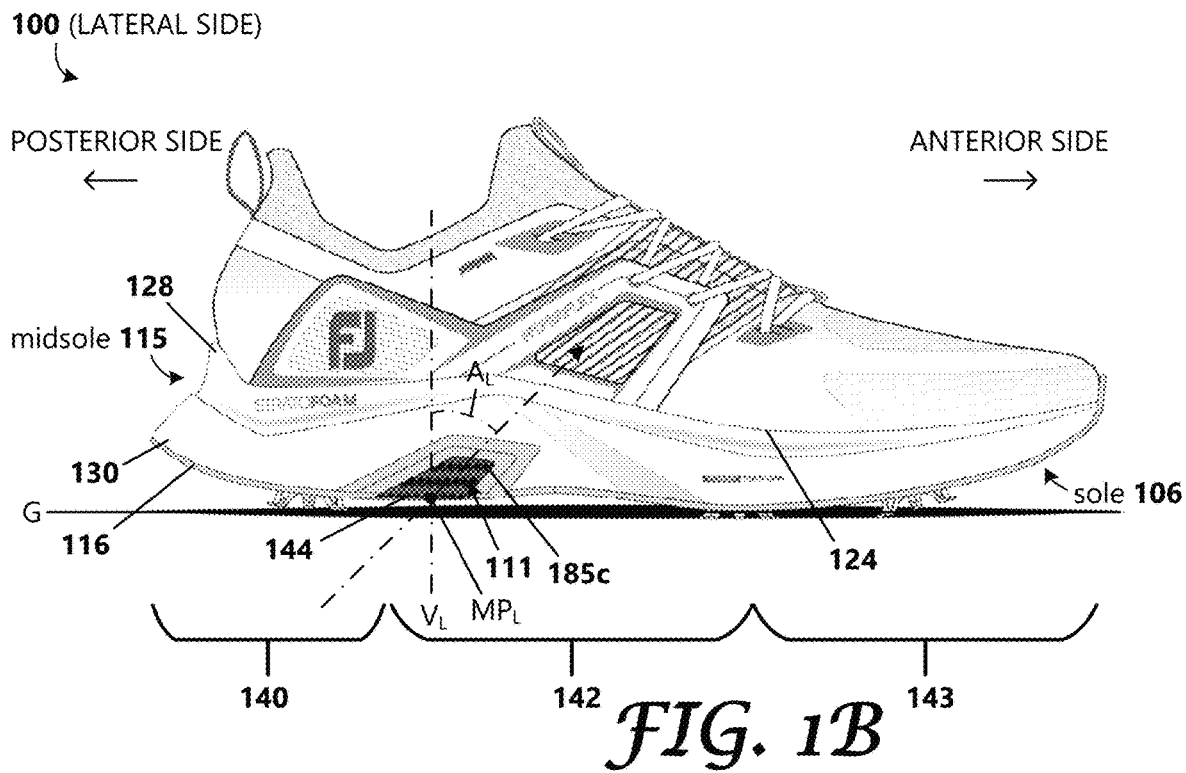
FIG. 1B depicts a lateral side view of the golf shoe of FIG. 1A according to an example.
Figure 1C:
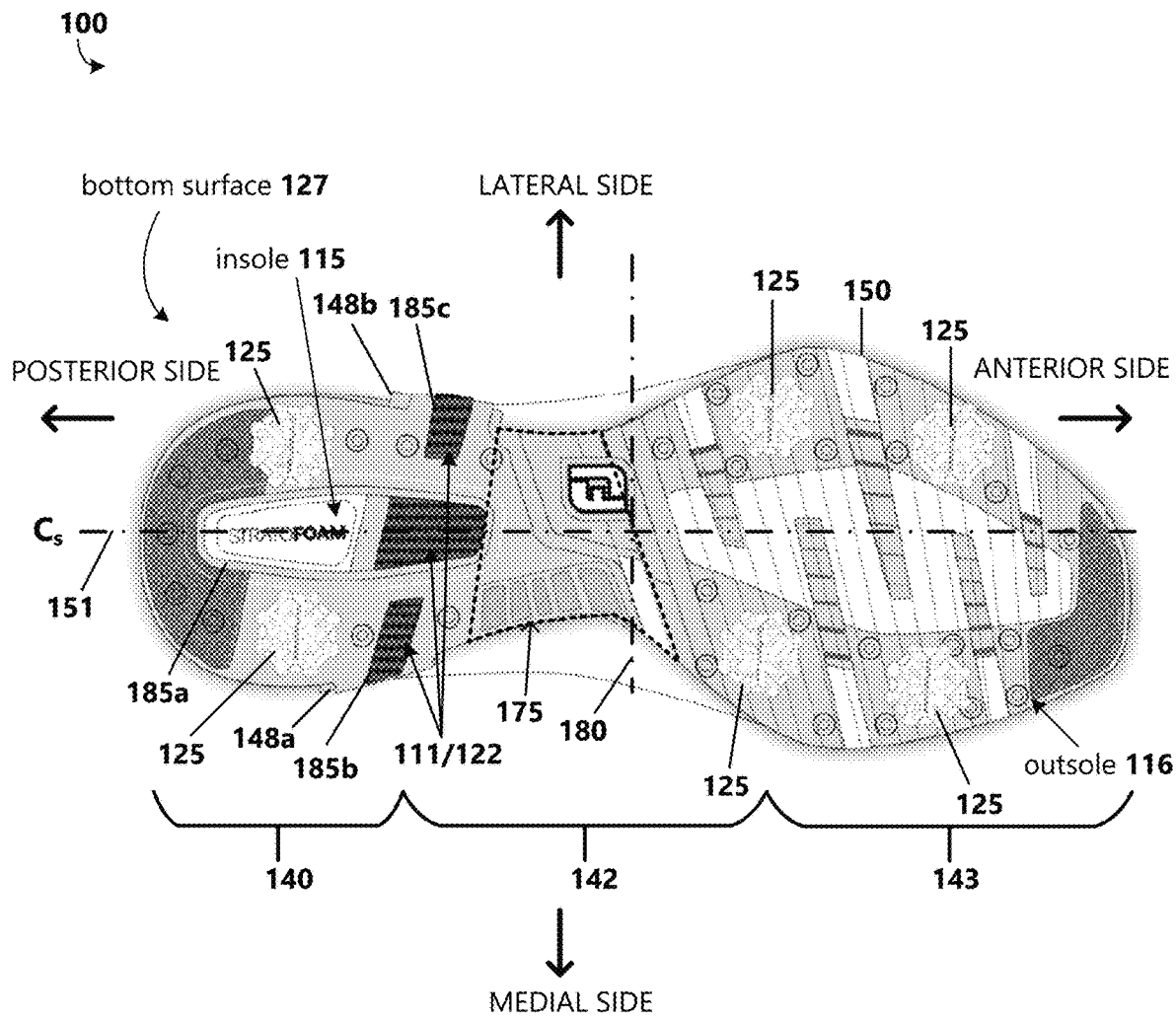
FIG. 1C depicts a bottom view of the golf shoe of FIG. 1A according to an example.

FIGS. 1A-1C depict various views of an example golf shoe 100, sometimes referred to herein generally as a shoe, in which aspects of a U-shaped reinforcement structure may be implemented. For example, FIG. 1A is a medial (e.g., inner) side view of the shoe 100, FIG. 1B is a lateral (e.g., outer) side view of the of the shoe 100, FIG. 1C is a bottom view of the shoe 100. The shoe 100 may generally include a shoe upper 104 and a sole assembly 106. The sole assembly 106 may include a midsole 115 and outsole 116. Some example sole assemblies 106 that can be incorporated in the shoe 100 are described in U.S. Pat. No. 11,019,874 titled "Golf Shoe Having Outsole with All-Surface Traction Areas" filed on Dec. 20, 2018, and U.S. Patent Application No. 2020/038,3421 titled "Golf Shoe Having Midsole and Outsole for Providing Flex and Stability" filed Aug. 26, 2019, the disclosures of which are incorporated by reference herein in their entireties.

The midsole 115 may be positioned above the outsole 116, such that the midsole 115 may be between the wearer's foot and the outsole 116. According to an example, a reinforcement structure 111 may be at least partially embedded within or otherwise secured to the sole assembly 106. A bottom or outer surface 127 of the outsole 116 may be configured to engage the ground surface G on which the wearer is standing, walking, or performing a golfing action. A top or inner surface of the outsole 116 (not shown) may be configured to engage a bottom surface 131 of the midsole 115 and, in some examples, a bottom surface of the reinforcement structure 111, which may be arranged between the midsole 115 and outsole 116. As will be described in further detail below, the reinforcement structure 111 may be formed to cradle a portion of the golfer's foot to provide midsole rigidity and allow forefoot flex. For example, the material from which the reinforcement structure 111 is constructed may have a hardness level (durometer) higher than the material(s) of the midsole 115 and outsole 116. For example, the reinforcement structure 111 may be constructed of any suitable reinforcing material such as a carbon composite material, fiberglass composite material, TPU composite material, or other material that may provide additional structural rigidity to the shoe 100. In one example, the material may comprise a binding matrix (resin) and reinforcing fiber. The binding polymer can be a thermoset material, such as polyester, polyolefin, nylon, or polyurethane. In an example, a carbon fiber, such as graphite, may be used as the reinforcing fibers. Other fibers, such as aramids (e.g., Kevlar™), aluminum, or glass fibers can be used in addition to or in place of the carbon fibers. In an example, the material may have a flexural rigidity of approximately greater than 45 N-cm, as determined via the ASTM D790-10 method. In another example, the material may have a flexural strength of approximately greater than 148 MPa and a flexural modulus of approximately greater than 7,445 MPa, as determined via the ASTM D790-10 method per testing performed in carbon direction. In an illustrative example, the fiber-reinforced thermoplastic composite material may have an approximate thickness of 1.0 mm or between 0.6 mm to 2 mm.

In general, the anatomy of the foot can be divided into three bony regions. A rearfoot region generally includes the ankle (talus) and heel (calcaneus) bones. A midfoot region includes the cuboid, cuneiform, and navicular bones that form the longitudinal arch of the foot. The forefoot region includes the metatarsals and the toes. The shoe 100, and accordingly, the upper 104, midsole 115, and outsole 116, may generally include a rearfoot area 140 corresponding to the rearfoot and that may include a heel area, a midfoot area 142 that corresponds to the midfoot region, and a forefoot area 143 corresponding to the forefoot region and which may include a toe area. It is understood that the rearfoot area 140, midfoot area 142, and forefoot area 143 are intended to represent general areas of footwear and not demarcate precise areas. As described herein, the rearfoot area 140 (and heel area) is considered to be a posterior end of the shoe 100, and, conversely, the forefoot area 143, including the toe area, is considered to be an anterior end of the shoe 100.

As shown in FIG. 1C, in addition to having a rearfoot area 140, midfoot area 142, and forefoot area 143, the shoe 100, and accordingly, the upper 104, midsole 115, and outsole 116, may also have a medial side and a lateral side that are opposite to one another. The medial side may generally correspond with an inside area of the wearer's foot and a surface that faces toward the wearer's other foot. The lateral side may generally correspond with an outside area of the wearer's foot and a surface that faces away from the wearer's other foot. The lateral side and the medial side may extend through each of the rearfoot area 140, the midfoot area 142, and the forefoot area 143 and correspond with opposite sides of the shoe 100 (e.g., and upper 104, midsole 115, and outsole 116). The medial side and a lateral side may extend around the periphery 150 or perimeter of the shoe 100. For example, the anterior end and posterior end may apply to the shoe 100 in general, and an anterior end and posterior end may apply to each of the upper 104, midsole 115, and outsole 116 and associated areas in reference or relation to orientation toward the front or back of the shoe 100.

The upper 104 may have a traditional shape and may be made from a combination of standard upper materials such as, for example, natural leather, synthetic leather, knits, non-woven materials, natural fabrics, and synthetic fabrics. For example, breathable mesh and synthetic textile fabrics made from nylons, polyesters, polyolefins, polyurethanes, rubbers, foams, and combinations thereof can be used. The material used to construct the upper 104 may be selected based on desired properties such as breathability, durability, flexibility, comfort, and water resistance. The upper material is stitched or bonded together to form an upper structure using traditional or non-traditional manufacturing methods. As an example of a non-traditional manufacturing method, the shoe 100 may have an upper 104 comprised of a single piece of flat knit engineered mesh with vacuum hot melt reinforcements. In one example, the shoe 100 may be waterproof, and the forefoot area 143 of the upper 104 and at least an outermost layer of the upper 104 may be constructed of one or a combination of materials having water resistant properties. Additional waterproofing features (described below) may be applied in construction of the shoe 100 for providing additional waterproofing capabilities.

The upper 104 may include a vamp 108, for covering a forepart of the foot, connected to a quarter 102, for covering and/or supporting the rear portions of a wearer's foot (e.g., the area surrounding and below the Achilles tendon, the posterior of the heel, and the talus and calcaneus bones). In one example, the heel area of the quarter 102 may include a molded heel cup 103. In another example, the quarter 102 may be a molded heel cup. For instance, the quarter 102 may be comprised of a plurality of layers that may be molded together to form the heel cup 103. In another example, the upper 104 may include a continuous piece of material for the vamp 108 and quarter 102.

The upper 104 may include an instep region 117 with an opening 114 for inserting a foot. In some examples, the upper 104 may further include a soft, molded foam heel collar 118 extending around at least a portion of the opening 114 for providing enhanced comfort and fit. The instep region 117 may include a tongue member 110. A variety of tightening system can be used for tightening the shoe 100 around the contour of the foot. For example, laces 119 of various types of materials (e.g., natural or synthetic fibers, metal cable) may be included in the tightening system. In one example, the shoe 100 may include a metal cable (lace)-tightening assembly that may comprise a dial, spool, and housing and locking mechanism for locking the cable in place.

Figure 3A:
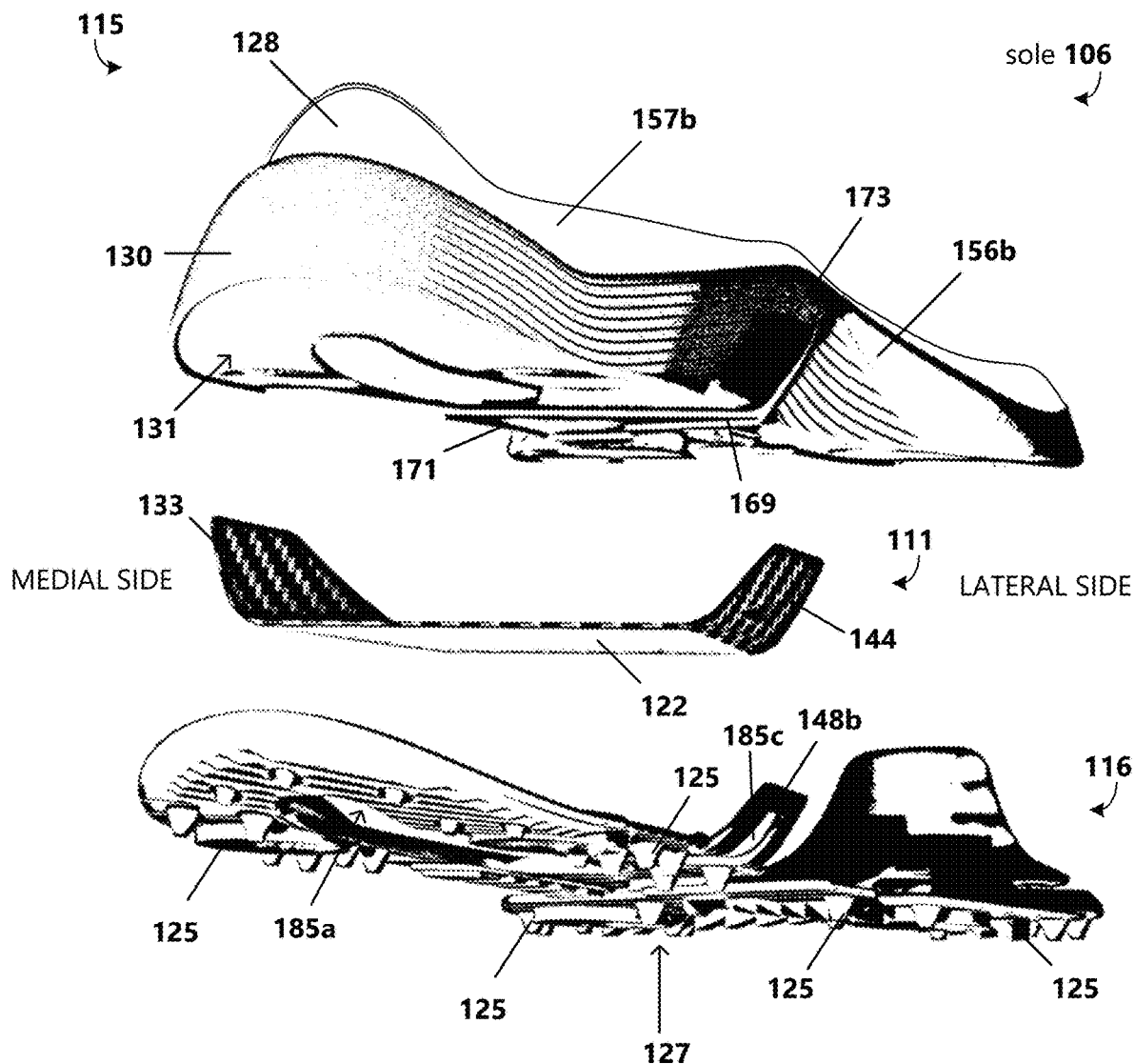
FIG. 3A depicts a bottom rear perspective exploded view of a sole assembly of a golf shoe in which a reinforcement structure may be implemented according to an example.

It should be understood that the above-described upper 104 shown in FIGS. 1-C represents only one example of an upper design that can be used in the shoe 100 construction of this disclosure and other upper designs can be used without departing from the spirit and scope of this disclosure. Some features of the shoe 100 may be similar to that described in U.S. patent application Ser. No. 16/576,854, titled "GOLF SHOE HAVING COMPOSITE PLATE IN MIDSOLE FOR PROVIDING FLEX AND STABILITY," filed on Sep. 20, 2019, the entire disclosure of which is incorporated by reference in its entirety. Referring still to FIGS. 1A-1C, and with concurrent reference to FIGS. 2A-2C and 3A-C, a sole assembly 106 according to a first example is described. FIG. 2A includes a medial view of an example sole assembly 106, FIG. 2B includes a bottom view of the sole assembly 106 of FIG. 2A, and FIG. 2C includes a lateral view of the sole assembly 106 of FIGS. 2A-2B. FIG. 3A includes an exploded view of the first example sole assembly 106, FIG. 3B includes a top schematic view of the first example sole assembly 106, and FIG. 3C includes a cross-sectional view of the first example sole assembly 106.

As used herein, a longitudinal centerline $C_s$ 151 of the sole assembly 106 (FIGS. 2B, 3B, and 4C) may refer to a primary axis of length along the center of the shoe 100. The longitudinal centerline $C_s$ 151 may bisect the rearfoot area 140 and may extend parallel or approximately parallel to the lateral side edge of the sole assembly 106. For example, the centerline of at least the back half of the wearer's foot, which may extend centrally through the wearer's calcaneus, may generally align with the longitudinal centerline $C_s$ 151. Thus, the longitudinal centerline $C_s$ 151 may represent both the centerline of the wearer's foot and the centerline of the rearfoot area 140 of the sole assembly 106, although, as appreciated, a true centerline of the wearer's foot may intersect the longitudinal centerline $C_s$ 151 at a slight acute angle and extend between the second and third metatarsal.

As stated above, the sole assembly 106 may comprise a midsole 115 and an outsole 116. The midsole 115 may be relatively lightweight and provides cushioning to the shoe 100. The midsole 115 may be made from midsole materials such as, for example, foamed ethylene vinyl acetate copolymer (EVA) or foamed polyurethane compositions. In one example, the midsole 115 may be constructed using two different foamed materials as described below.

As shown in FIGS. 1A, 1B, 2A, 2C, 3A, and 3C, the midsole 115, 215 may comprise two (2) regions: an upper layer 128 and a lower layer 130. The upper layer 128 may be made of a relatively soft and flexible material. For example, the upper layer 128 may be made of a relatively soft first EVA foam composition having a first hardness level (durometer). The lower layer 130 may be made of a relatively firm material, such as a second EVA foam composition having a second hardness level (durometer). That is, the lower layer 130 may have a greater hardness level (durometer) than the upper layer 128. In one example, a blend of EVA and styrenic block copolymer rubber (such as "SI", "SIS", "SB", "SBS", "SIBS", "SEBS", "SEPS" and the like, where "S" is styrene, "I" is isobutylene, "E" is ethylene, "P" is propylene, and "B" is butadiene), can be used to form the relatively firm second EVA foam composition.

As stated above, the lower layer 130 may have a greater hardness level (durometer) than the upper layer 128. In an example, the upper layer 128 may have a durometer ranging from approximately 40 to about 75 Shore C, while the lower layer 130 may have a durometer ranging from approximately 45 to about 80 Shore C. In another example, the relatively soft first EVA foam composition of the upper layer 128 may have a Shore C hardness in the range of approximately 50 to approximately 70, and the relatively firm second EVA foam composition of the lower layer 130 may have a Shore C hardness in the range of approximately 50 to approximately 75 Shore C. In another example, the relatively soft first EVA foam composition of the upper layer 128 may have a durometer in the range of approximately 55 to approximately 60 Shore C, and the relatively firm second EVA foam composition of the lower layer 130 may have a durometer in the range of approximately 65 to approximately 70 Shore C. For example, the hardness of the foamed lower layer 130 may be at least 5% greater than the hardness of the foamed upper layer 128. In some examples, the hardness of the foamed lower layer 130 may be at least 10% or 15% greater; and in other examples, at least 20% or 25% greater.

The densities of the first foamed composition and second foamed composition may also be different. For example, the density of the relatively firm second EVA foamed composition used to form the lower layer 130 may be greater than the density of the relatively soft first EVA foamed composition used to form the upper layer 128. Different foaming additives and catalysts may be used to produce the EVA foam compositions used to form the midsole 115. For example, the EVA foam composition normally contains polyethylene. The EVA foam compositions have various properties making them particularly suitable for constructing midsoles 115 including good cushioning and shock absorption; high water and moisture-resistance; and long-term durability. In some examples, the lower layer 130 of the midsole 115 may form a first (lower) sidewall 156 of the midsole 115, which may help hold and support the medial and lateral sides of the golfer's foot. The lower sidewall 156 may include a lower medial sidewall 156a disposed on the medial side of the lower layer 130 of the midsole 115 and a lower lateral sidewall 156b disposed on the lateral side of the lower layer 130 of the midsole 115. In other examples, a second (upper) sidewall 157 of the midsole 115 may be formed by the upper layer 128. The upper sidewall 157 may include an upper medial sidewall 157a disposed on the medial side of the upper layer 128 of the midsole 115 and an upper lateral sidewall 157b disposed on the lateral side of the upper layer 128 of the midsole 115.

In some examples, and as shown in FIG. 3A, the midsole 115 may include a cavity comprised of a plurality of nesting areas 169, 171, 173 defined in the lower surface of the lower layer 130 of the midsole 115 and in the lower sidewalls 156 that may be configured to receive the reinforcement structure 111. In some examples and as shown in FIGS. 3A, 3C, 5A and 5B, the reinforcement structure 111 may be generally U-shaped with a medial side wing 133, a lateral side wing 144, and a bridge 122 connecting the medial side wing 133 and lateral side wing 144. For example, the reinforcement structure 111 may be positioned within the plurality of nesting areas s and sandwiched between the midsole 115 and outsole 116. In other examples (described below with reference to FIGS. 4A-4D, 8, and 10), the reinforcement structure 111 may be at least partially embedded within the midsole 115. As shown in FIGS. 1C, 3B, and 4C, the reinforcement structure 111 may be included in the sole assembly 106 and positioned behind a shank area 175 that may be located at approximately a midline 180 of the shoe 100. For instance, the reinforcement structure 111 may be located at the posterior (rearward) end of the midfoot area 142, between the rearfoot area 140 and the midfoot area 142, and/or at the anterior (forward) end of the rearfoot area 140.

According to an example, a central nesting area 169 of the cavity defined in the midsole 115 may be formed across the bottom surface 131 of the lower layer 130, a medial nesting area 171 may be formed into the lower medial sidewall 156a, and a lateral nesting area 173 may be formed into the lower lateral sidewall 156b. For example, the medial nesting area 171 formed in the lower medial sidewall 156a may be configured to receive the medial side wing 133 of the reinforcement structure 111, the lateral nesting area 173 formed into the lower lateral sidewall 156b may be configured to receive the lateral side wing 144 of the reinforcement structure 111, and the central nesting area 169 formed into the bottom surface 131 of the lower layer 130 of the midsole 115 may be configured to receive the bridge 122 connecting the medial side wing 133 and lateral side wing 144. For example, the central nesting area 169 may extend from the medial side to the lateral side of the bottom surface 131 of the lower layer 130 of the midsole 115. As should be appreciated, the central nesting area 169, medial nesting area 171, and lateral nesting area 173 may be configured to assume a similar contour and positioning as the reinforcement structure 111 to provide a nest for the reinforcement structure 111. Contour and positioning of the reinforcement structure 111 are described in detail below.

The outsole 116 may be designed to provide support and traction for the shoe. As shown in FIGS. 1C and 3A, a bottom surface 127 of the outsole 116 may include a plurality of traction members 125 (e.g., spikes, soft spikes, or other removable or permanent features) to help provide traction between the shoe 100 and the different surfaces of a golf course or other ground surfaces (G). The traction members 125 can be made of any suitable material such as rubbers, plastics, and combinations thereof. Thermoplastics such as nylons, polyesters, polyolefins, and polyurethanes can be used. In one preferred embodiment, the traction members 125 are made of a relatively hard thermoplastic polyurethane (TPU) composition. Different polyamide compositions including polyamide copolymers and aramids also can be used to form the traction members. In an example, an elastomer comprised of block copolymers of rigid polyamide blocks and soft polyether blocks can be used. Suitable rubber materials include, but are not limited to, polybutadiene, polyisoprene, ethylene-propylene rubber ("EPR"), ethylene-propylene-diene ("EPDM") rubber, styrene-butadiene rubber, styrenic block copolymer rubbers (such as "SI", "SIS", "SB", "SBS", "SIBS", "SEBS", "SEPS" and the like, where "S" is styrene, "I" is isobutylene, "E" is ethylene, "P" is propylene, and "B" is butadiene), polyalkenamers, butyl rubber, nitrile rubber, and blends of two or more thereof. Various structures and geometries of traction members 125 and outsoles 116 may be included and are within the scope of the present disclosure.

In some examples, and as shown in FIGS. 1C, 2A-C, and 3A, the outsole 116 may comprise a medial extension 148a and a lateral extension 148b, and a toe cap 153. The medial extension 148a may extend from the medial perimeter of the outsole 116, and may be molded or otherwise formed to project upward in alignment with the medial nesting area 171 formed into the lower medial sidewall 156a of the midsole 115 and the medial side wing 133 of the reinforcement structure 111. For example, the medial extension 148a may be molded to fit around and accommodate the medial side wing 133 of the reinforcement structure 111, such that the medial side wing 133 may be sandwiched between the midsole 115 and the outsole 116. Additionally, the lateral extension 148b may extend from the lateral perimeter of the outsole 116, and may be molded or otherwise formed to project upward in alignment with the lateral nesting area 173 formed into the lower lateral sidewall 156b of the midsole 115 and the lateral side wing 144 of the reinforcement structure 111. For example, the lateral extension 148b may be molded to fit around and accommodate the lateral side wing 144 of the reinforcement structure 111, such that the lateral side wing 144 may be sandwiched between the midsole 115 and the outsole 116.

Figure 3C:
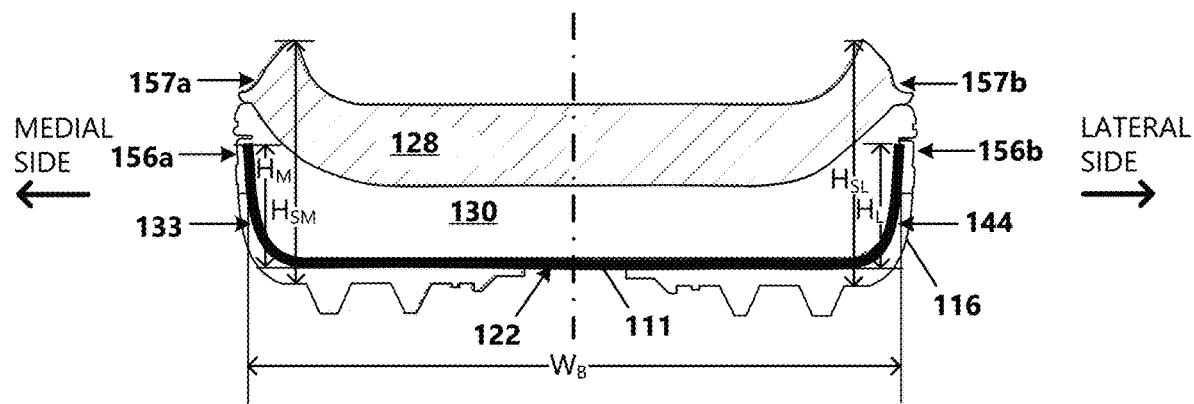
FIG. 3C depicts a cross-sectional view of the sole assembly of FIG. 3B according to an example.
Figure 5A:
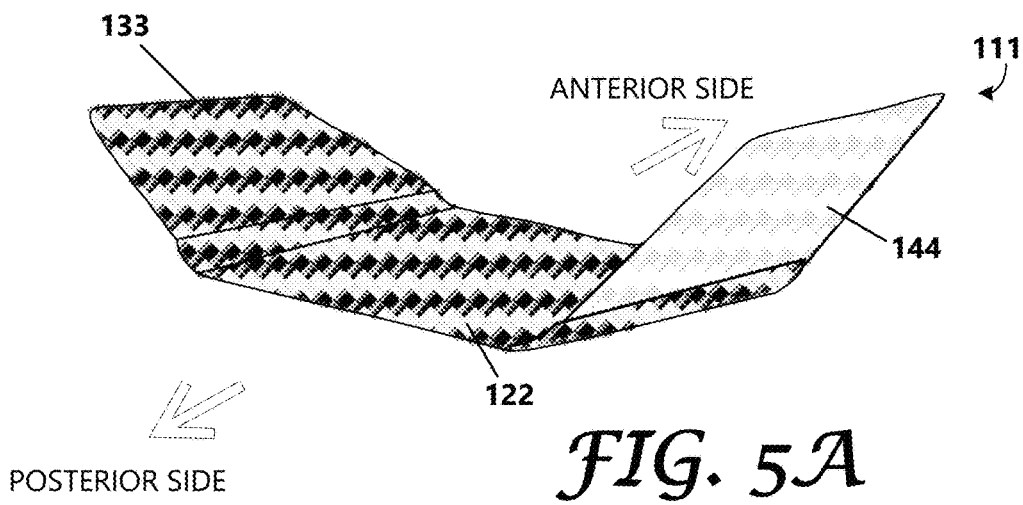
FIG. 5A depicts a rear perspective view of a reinforcement structure, where the bridge may be configured to extend a first example distance within the sole assembly according to an example.
Figure 5B:
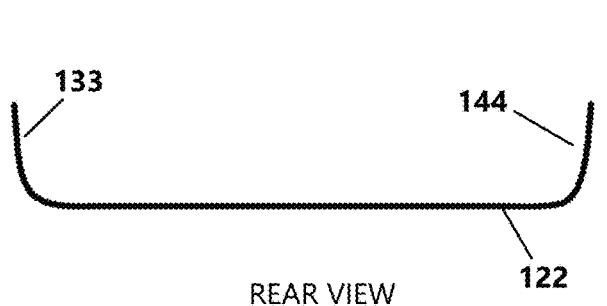
FIG. 5B depicts a rear view of the example reinforcement structure of FIG. 5A according to an example.

FIGS. 1A-C, 2A-C, 3A-C, 5A and 5B, illustrate an example reinforcement structure 111 according to a first example, shown from the medial side and embedded in the sole assembly 106 in FIGS. 1A and 2A, shown from the lateral side and embedded in the sole assembly 106 in FIGS. 1B and 2C, shown from below and embedded in the sole assembly 106 in FIGS. 1C and 2B, shown from behind and below in FIG. 3A, in a schematic representation from above and embedded in the sole assembly 106 in FIG. 3B, shown in a rear sectional view in FIG. 3C, shown from behind and above in FIG. 5A, shown in a rear view in FIG. 5B, and shown from the top in a cut but unformed state in FIG. 5C. As shown, the reinforcement structure 111 may be formed to be generally U-shaped to form the medial side wing 133, lateral side wing 144, and bridge 122 connecting the medial side wing 133 and lateral side wing 144.

Generally, the medial side wing 133 may extend from the medial side of the bridge 122 and may be molded or otherwise formed to extend upward along the lower medial midsole sidewall 156a, and the lateral side wing 144 may extend from the lateral side of the bridge 122 and may be molded or otherwise formed to extend upward along the lower lateral sidewall 156a of the midsole 115. The medial side wing 133 may provide increased reinforcement to the lower medial midsole sidewall 156a, which may help hold and support the medial side of the golfer's foot. The lateral side wing 144 may reinforce the lower lateral midsole sidewall 156b, which may help hold and support the lateral side of the golfer's foot. According to one example, the medial side wing 133 and the lateral side wing 144 may be formed such that an angle between the bridge 122 and the medial and lateral side wings 133,144 may range between 90-110 degrees.

In some examples, heights $H_M, H_L$ (FIG. 3C) of the medial side wing 133 and lateral side wing 144 may vary. In some examples, the medial side wing 133 height $H_M$ and the lateral side wing 144 $H_L$ may be the same or approximately similar. As an illustrative example, the medial side wing height $H_M$ and the lateral side wing height $H_L$ may range from approximately 25-80% of the medial height $H_{SM}$ and lateral height $H_{SL}$, respectively, of the sole assembly 106 of the shoe 100. The medial $H_M$ and lateral $H_L$ side wing heights may be measured from the bottom surface of the bridge 122 to a top edge of the medial 133 and lateral 144 side wings, and the medial height $H_{SM}$ and lateral height $H_{SL}$ of the sole assembly 106 may be measured from the bottom surface 127 of the outsole 116 (excluding the traction members 125) along vertical axes $V_M$ and $V_L$ (shown in FIGS. 1A and 1B) to a top edge of the upper layer 128 of the midsole 115.

Figure 5C:
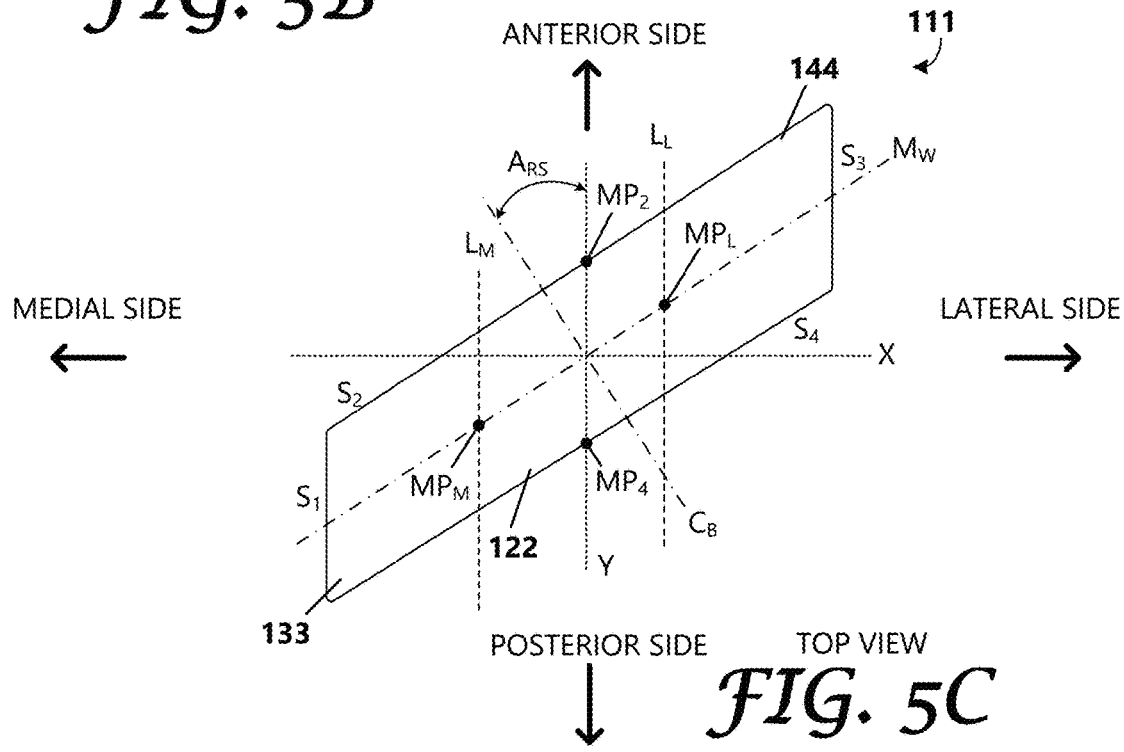
FIG. 5C depicts a top view of the example reinforcement structure of FIGS. 5A and 5B prior to being formed according to an example.

The medial vertical axis $V_M$ may be parallel to the ground surface G and intersect the perimeter of the bottom edge of the medial side wing 133 at a midpoint $MP_M$ along the bottom edge of the medial side wing 133 (shown in FIGS. 1A, 3B, and 5C). For example, the bottom edge of the medial side wing 133 may be an intersecting line between the bridge 122 and the medial side wing 133, and the medial midpoint $MP_M$ may divide the intersecting line in half. Likewise, the lateral vertical axis $V_L$ may be parallel to the ground surface G and intersect the perimeter of the bottom edge of the lateral side wing 144 at a midpoint $MP_L$ along the bottom edge of the lateral side wing 144 (shown in FIGS. 1B, 3B, and 5C). For example, the bottom edge of the lateral side wing 144 may be an intersecting line between the bridge 122 and the lateral side wing 144, and the lateral midpoint $MP_L$ may divide the intersecting line in half.

As another illustrative example, for an average adult male shoe size 100, the medial wing height $H_M$ and the lateral wing height $H_L$ may range approximately between 10-30 mm, 12-20 mm, or 14-18 mm in height. As another illustrative example, the medial side wing height $H_M$ and the lateral side wing height $H_L$ may extend to the height $H_S$ of the sole assembly 106. In other examples, the medial side wing 133 height $H_M$ and the lateral side wing 144 $H_L$ may differ, such that one side wing may extend higher along the midsole 115 that the other side wing. In one example, the lateral side wing 144 $H_L$ may extend higher than the medial side wing 133. In another example, the medial side wing 133 may extend higher than the lateral side wing 144 $H_L$.

With reference to FIG. 5C, a top view of the reinforcement structure 111, prior to being formed into its U shape, is shown according to an example. As shown, the reinforcement structure 111 may be cut into a shape of a parallelogram having 4 sides $S_1$-$S_4$, where the first side $S_1$ may be a top edge of the medial side wing 133, the third side $S_3$ may be a top edge of the lateral side wing 144, the second side $S_2$ may be a front (anterior) facing edge of the medial side wing 133, bridge 122, and lateral side wing 144, and the fourth side $S_4$ may be a back (posterior) facing edge of the medial side wing 133, bridge 122, and lateral side wing 144. According to an example, the lengths of the first side $S_1$ and the third side $S_3$ and the heights $H_M$,$H_L$ (FIG. 3C) of the medial side wing 133 and lateral side wing 144 may vary based on the lengths of the second side $S_2$ and the fourth side $S_4$. In one illustrative example, the lengths of the first side $S_1$ and the third side $S_3$ may be approximately ⅓ of the lengths of the second side $S_2$ and the fourth side $S_4$. In another illustrative example, for an average adult male shoe size 100, the average lengths of the first side $S_1$ and the third side $S_3$ may range from approximately 40-50 mm, and average lengths of the second side $S_2$ and the fourth side $S_4$ may range from approximately 90-125 mm.

Figure 6:
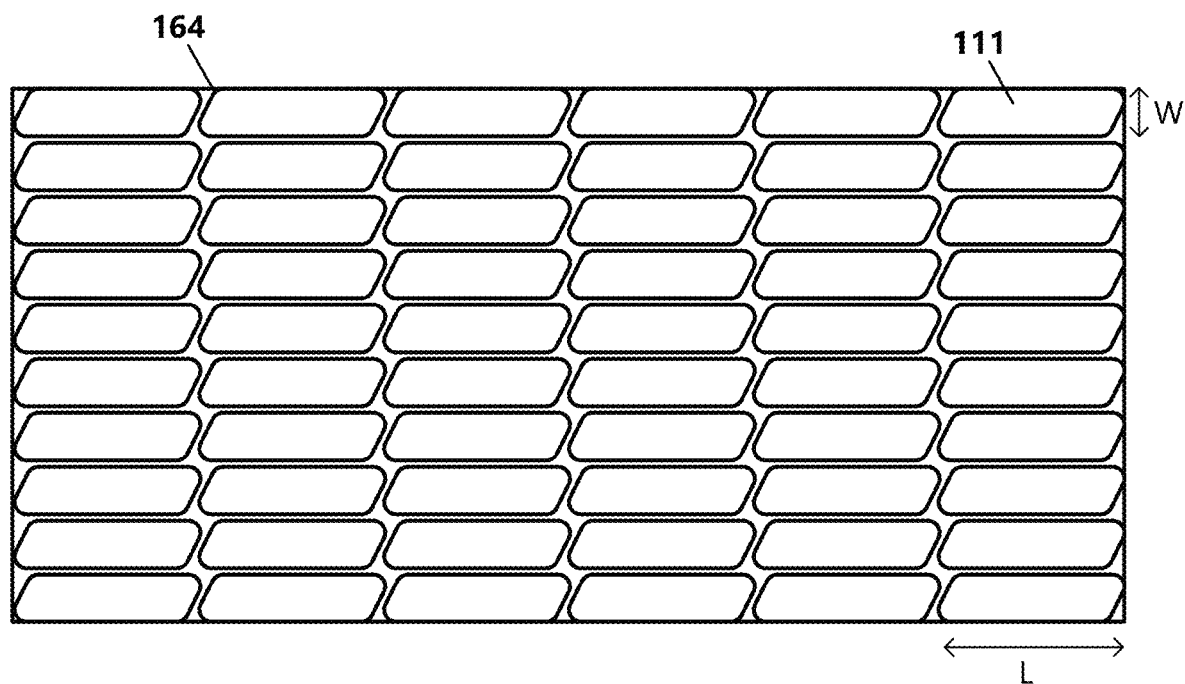
FIG. 6 depicts an example sheet of material from which a plurality of reinforcement structures may be produced.

In addition to providing various reinforcement benefits, as will be described in further detail below, the shape of the reinforcement structure 111 provides benefits and efficiency improvements for the manufacturing process as well. With reference to FIG. 6, as part of manufacturing the reinforcement structure 111, a plurality of reinforcement structures 111 may be cut from a sheet 164 of material. Due to the parallelogram shape, as shown, the sheet 164 of material may be efficiently used for producing a maximum number of reinforcement structures 111 with minimal additional material of the sheet 164 going unused. The reinforcement structures 111 may be cut using manufacturing cutting methods, such as via water jet, laser jet, die cut, etc. Additionally, after a plurality of reinforcement structures 111 having a width (W) and a length (L) are cut and formed, a plurality of reinforcement structures 111 may be easily and efficiently stacked. As can be appreciated, being able to easily and efficiently stack reinforcement structures 111 may increase various operational efficiencies of the shoe 100 manufacturing process (e.g., storing, transporting, handling, assembling).

With reference again to FIG. 5C, the reinforcement structure 111 is shown rotated, such that the first side $S_1$ and the third side $S_3$ of the reinforcement structure 111 may be approximately parallel in reference to a first axis Y (and approximately perpendicular to a second axis X). Additionally, the second side $S_2$ and the fourth side $S_4$ may be angled inward in reference to the first axis Y. When the reinforcement structure 111 is assembled into the sole assembly 106, the reinforcement structure 111 may be positioned similar to the illustrated rotation, such that the first axis Y may be in alignment with the longitudinal centerline $C_s$ 151 of the sole assembly 106, and the horizontal axis H may be perpendicular to the longitudinal centerline $C_s$ 151. According to an example, the second axis X may be approximately in alignment with the cross-section plane A1-A2 shown in FIG. 3B.

With reference again to FIG. 5C, according to an example, a midline $M_W$ of the wings of the reinforcement structure 111 may connect the medial and lateral midpoints $MP_M$, $MP_L$. In some examples, such as in the examples shown in FIGS. 1A-C, 2A-C, 3A-C, and 5A and 5B, the midline $M_W$ of the wings of the reinforcement structure 111 may be approximately the same as the midline of the reinforcement structure 111.

Additionally, a longitudinal centerline $C_B$ of the bridge 122 of the reinforcement structure 111 may be perpendicular to the midline $M_W$ of the wings and connect midpoints $MP_2$, $MP_4$ of the bridge 122 portion of the second side $S_2$ and the fourth side $S_4$ of the reinforcement structure 111. When the reinforcement structure 111 is assembled into the sole assembly 106, the reinforcement structure 111 may be positioned such that the longitudinal centerline $C_B$ of the bridge 122 of the reinforcement structure 111 may have an inward angular deviation $A_{RS}$ of approximately 5-25 degrees relative to the longitudinal centerline $C_s$ 151. For instance, the angle $A_{RS}$ between the longitudinal centerline $C_B$ of the bridge 122 and the longitudinal centerline $C_s$ 151 may be between 5-25 degrees.

According to an example, the medial side wing 133 and the lateral side wing 144 may be formed by bending the material of the cut reinforcement structure 111 along a medial form line $L_M$ and a lateral form line $L_L$ (e.g., shown in FIG. 5C). Thus, the bridge 122 portion of the second side $S_2$ and the fourth side $S_4$ of the reinforcement structure 111 may include the segments between the intersections of the medial form line $L_M$ and a lateral form line $L_L$.

Figure 4A:
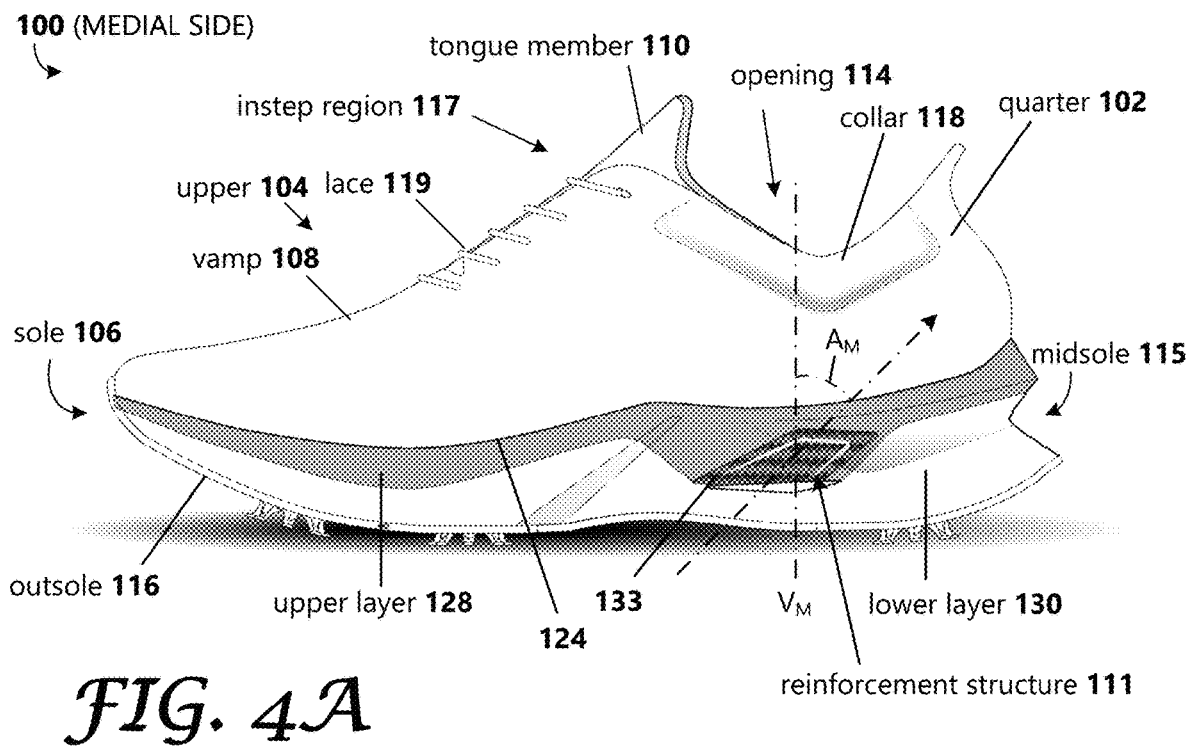
FIG. 4A depicts a medial side view of a golf shoe including a reinforcement structure according to another example.

The medial and lateral form lines $L_M$, $L_L$ may be approximately parallel to the first axis Y, such that when the reinforcement structure 111 is bent along the medial form line $L_M$ and assembled into the sole assembly 106, the medial side wing 133 may extend rearward toward the posterior side of the sole assembly 106 (as shown in FIGS. 1A, 2A, and 4A). As an illustrative example, the medial side wing 133 may have a rearward angle deviation $A_M$ of approximately 45 degrees relative to the medial vertical axis $V_M$. In some examples, the rearward angle $A_M$ of the medial side wing 133 may be between 30-60 degrees or 40-50 degrees. According to an example, the medial side wing 133 of the reinforcement structure 111 may reinforce the lower medial midsole sidewall 156a, which may help hold and support the medial side of the golfer's foot. For instance, the medial side wing 133 may help support the driving foot in the downswing or the stabilizing foot in the upswing.

Figure 4B:
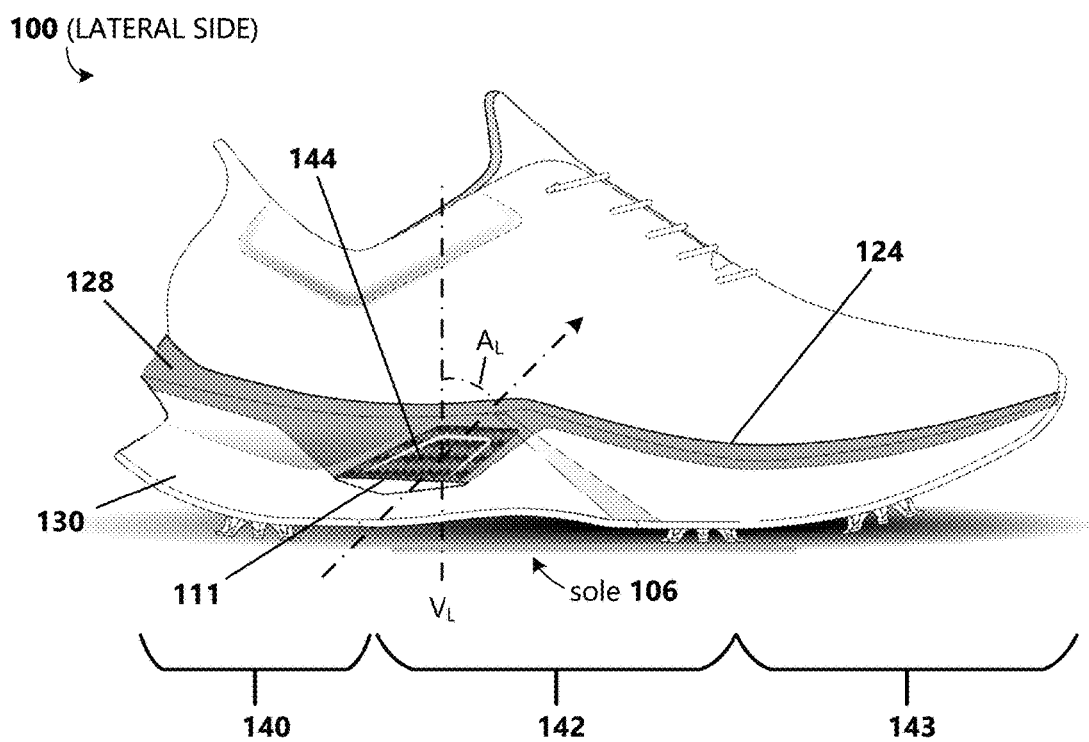
FIG. 4B depicts a lateral side view of the golf shoe of FIG. 4A according to an example.
Figure 4C:
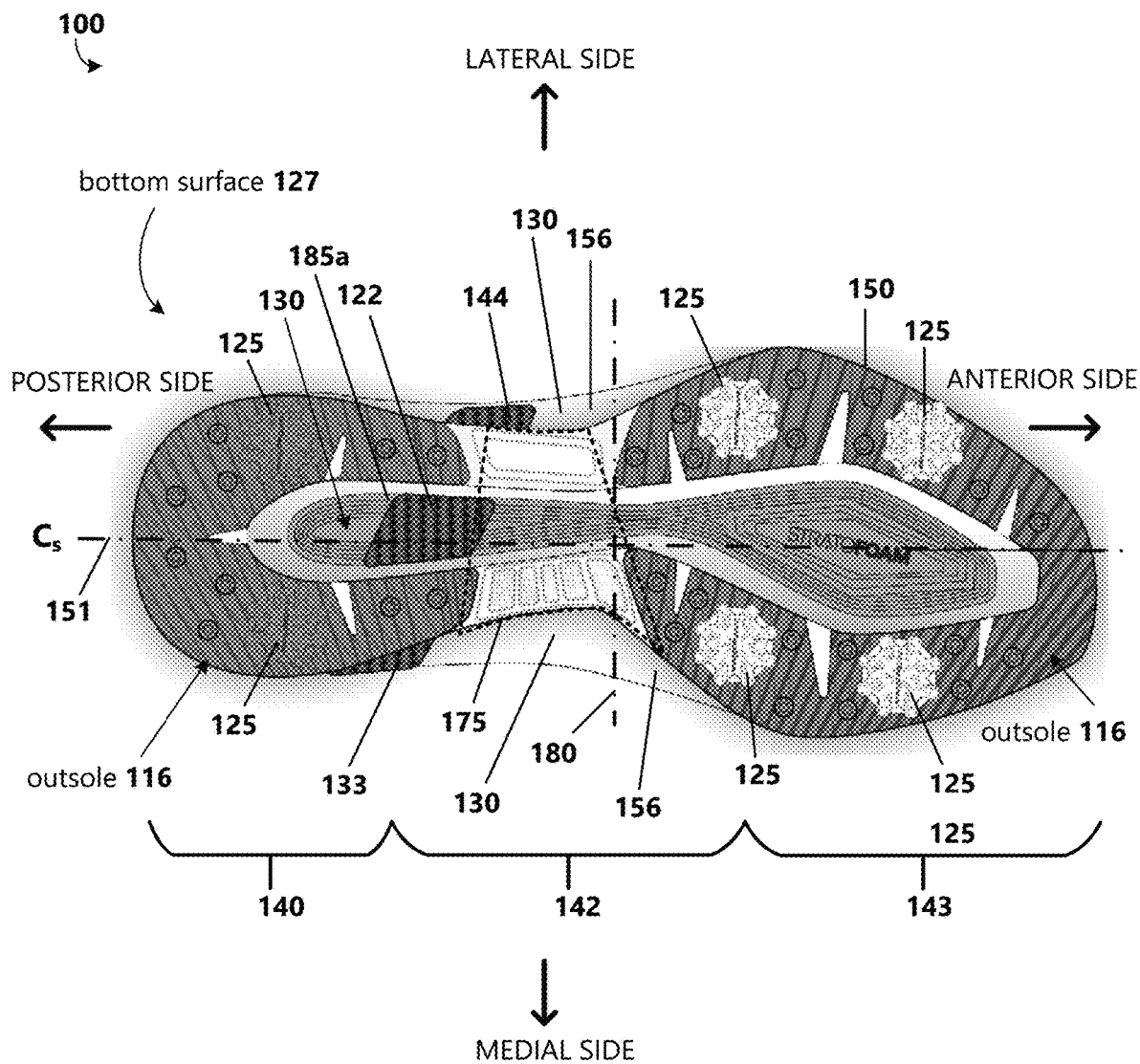
FIG. 4C depicts a bottom view of the golf shoe of FIG. 4A according to an example.
Figure 4D:
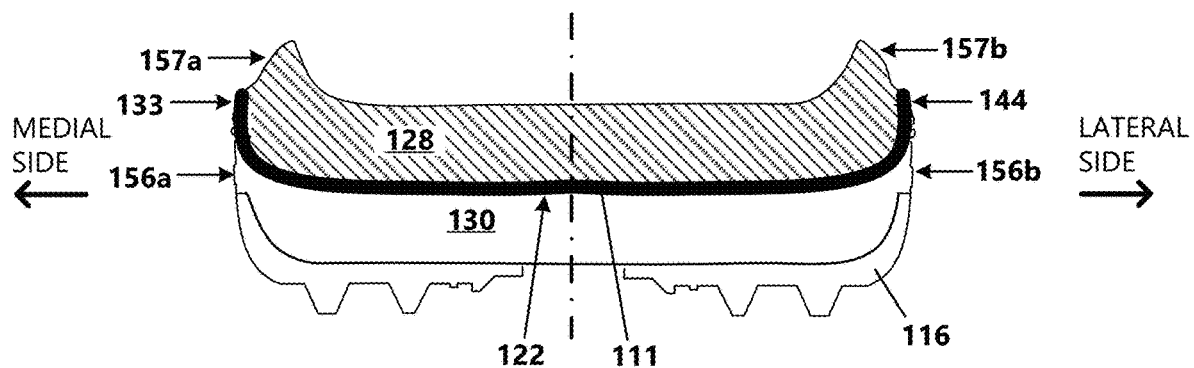
FIG. 4D depicts a cross-sectional view of the sole assembly of FIG. 3B, where the reinforcement structure is at least partially embedded within a midsole according to an example.

As mentioned above, the lateral form line $L_L$ may be approximately parallel to the first axis Y, such that when the reinforcement structure 111 is bent along the lateral form line $L_L$ and assembled into the sole assembly 106, the lateral side wing 144 may extend forward toward the anterior side of the sole assembly 106 (as shown in FIGS. 1B, 2C, and 4B). As an illustrative example, the lateral side wing 144 may have a forward angle deviation $A_L$ of approximately 45 degrees relative to the lateral vertical axis $V_L$. In some examples, the forward angle $A_L$ of the lateral side wing 144 may be between 30-60 degrees or 40-50 degrees. According to an example, the lateral side wing 144 of the reinforcement structure 111 may reinforce the lower lateral midsole sidewall 156b, which may help hold and support the lateral side of the golfer's foot. For instance, the lateral side wing 144 may provide a stiffer midfoot area 142 to provide midfoot support for the golfer's driving foot during the golf swing.

In some examples and as shown in FIG. 3B, the reinforcement structure 111 may be designed and positioned in the sole assembly 106 such that the medial midpoint $MP_M$ along the bottom edge of the medial side wing 133 may be located at a distance $D_{M1}$ that (e.g., for an average adult male shoe 100 size) may range from approximately 85-105 mm measured from the most-posterior point of the sole assembly 106 toward the anterior side of the sole assembly 106 along the longitudinal centerline $C_s$ 151 axis. According to another example, the reinforcement structure 111 may be designed and positioned in the sole assembly 106 such that the medial midpoint $MP_M$ is located an approximate range of 25-33% of the total sole assembly 106 length $L_S$ from the most-posterior point to the most-anterior point of the sole assembly 106 as measured along the longitudinal centerline $C_s$ 151 axis.

In some examples, the reinforcement structure 111 may be designed and positioned in the sole assembly 106 such that the lateral midpoint $MP_L$ along the bottom edge of the lateral side wing 144 may be located at a distance $D_{L1}$ that (e.g., for an average adult male shoe 100 size) may range from approximately 95-115 mm measured from the most-posterior point of the sole assembly 106 toward the anterior side of the sole assembly 106 along the longitudinal centerline $C_s$ 151 axis. According to another example, the reinforcement structure 111 may be designed and positioned in the sole assembly 106 such that the lateral midpoint $MP_L$ may be located at a distance $D_{L1}$ that is within an approximate range of 30-36% of the total sole assembly 106 length $L_S$ from the most-posterior point to the most-anterior point of the sole assembly 106 as measured along the longitudinal centerline $C_s$ 151 axis. In some examples, such as in the examples shown in FIGS. 1A-3C, the bridge 122 may extend from the periphery 150 of the medial side of the sole assembly 106 to the periphery 150 of the lateral side of the sole assembly 106. As can be appreciated, the width of the sole assembly 106 and, accordingly, the bridge 122 $W_B$ may vary relative to the size of the shoe 100.

In some examples, and as will be described in further detail below, a distance $D_B$ that the bridge 122 may extend within the sole assembly 106 may vary. The distance $D_B$ that the bridge 122 may extend within the sole assembly 106 may be measured generally from a front-most (or a most-anterior) point of the bridge 122 to a back-most (or a most-posterior) point of the bridge 122. For example, the distance $D_B$ that the bridge 122 may extend may be measured along the first (Y) axis of the reinforcement structure 111 and the longitudinal centerline $C_s$ 151 axis of the sole assembly 106 from the most-posterior point of the bridge 122 along the fourth side $S_4$ of the reinforcement structure 111 to most-anterior point of the bridge 122 along the second side $S_2$ of the reinforcement structure 111.

In some examples, and as shown in FIGS. 1C, 2B, 3A, and 4C, one or more openings 185a-n may be defined in the outsole 116 through which portions of other structures of the sole assembly 106 may be exposed and/or may be visible. According to an example, a first opening 185a may be defined in the rearfoot area 140 of the outsole 116 and may generally align with the longitudinal centerline $C_s$ 151 of the sole assembly 106. The first opening 185a may sometimes be referred to as a central opening. In some examples, a portion of the reinforcement structure 111 included in the sole assembly 106 may be exposed through the first opening 185a. In some examples, a portion of the lower layer 130 of the midsole 115 may additionally be exposed through the first opening 185a.

According to another example, a second opening 185b, which may sometimes be referred to as a medial opening, may be defined along a portion of the medial perimeter of the bottom surface 127 of the outsole 116, and may extend into the medial extension 148a of the outsole 116. For instance, the second opening 185b may generally align with the medial wing 133 of the reinforcement structure 111 included in the sole assembly 106, a portion of which may be exposed through the second opening 185b. A portion of the bridge 122 may additionally be exposed through the second opening 185b, as shown in FIG. 1C.

According to another example, a third opening 185c, which may sometimes be referred to as a lateral opening, may be defined along a portion of the lateral perimeter of the bottom surface 127 of the outsole 116, and may extend into the lateral extension 148b of the outsole 116. For instance, the third opening 185c may generally align with the lateral wing 144 of the reinforcement structure 111 included in the sole assembly 106, a portion of which may be exposed through the third opening 185c. A portion of the bridge 122 may additionally be exposed through the third opening 185c, as also shown in FIG. 1C.

As described above with reference to FIGS. 1A-C, 2A-C, 3A, and 3C, in some examples, the reinforcement structure 111 may be disposed between the midsole 115 and the outsole 116. In some examples, the reinforcement structure 111 and the outsole 116 may be fabricated as a co-molded assembly and then aligned and coupled to the midsole 115. In one example, the reinforcement structure 111 may be cut from a sheet of material, molded into shape, and then placed in a TPU mold, where TPU resin may flow around the reinforcement structure 111 to produce a more rigid structure and connection to the outsole 116. In another example, the outsole 116 may be formed and the reinforcement structure 111 may be cut, formed, and then aligned and attached to the outsole 116 in the defined cavity configured to receive the reinforcement structure 111. According to an example, the midsole 115 can be molded as a separate piece and then joined to a top surface (not shown) of the outsole 116 by stitching, adhesives, or other suitable means using standard techniques known in the art. For example, the midsole 115 can be heat-pressed and bonded to the top surface of the outsole 116 and reinforcement structure 111 assembly. In some examples, the midsole 115 can be molded using a 'two-shot' molding method. The sole assembly 106 may be attached to the upper 104 at a feather line 124 (shown in FIGS. 1A and 1B). Prior to attachment to the sole assembly 106, the upper 104 may be pulled onto a last, and a lasting board may be attached to the upper 104 with an adhesive. The lasting board may then be attached to the sole assembly 106 with an adhesive for producing the shoe 100. It should be understood that other sole characteristics can be used in the shoe 100 constructions of this disclosure can be used without departing from the spirit and scope of this technology.

In some examples, an insole (not shown), which may be worn inside the shoe 100, may be designed to provide cushioning or comfort for the wearer of the shoe 100. The insole may be above the outsole 116 when in use. In some embodiments, the insole may be designed to provide support. The insole may be flexible, semi-rigid, or rigid. In some examples, the insole may be removable.

As mentioned above, in other examples, and as shown in FIGS. 4A-C, 8, and 10, the bridge 122 of the reinforcement structure 111 may be at least partially embedded within the midsole 115. According to one example, the reinforcement structure 111 may be disposed between the upper layer 128 and the lower layer 130 of the midsole 115. In this example, a cavity or nesting area may be formed on one or both of: an upper surface of the lower layer 130 and a lower surface of the upper layer 128 that may be used to position the reinforcement structure 111 between the lower layer 130 and the upper layer 128. For example, the cavity or nesting area may be a recessed area configured to receive the reinforcement structure 111, similar to the cavity defined in the lower surface of the lower layer 130 of the midsole 115 and in the lower sidewalls 156 comprising the plurality of nesting areas 169, 171, 173 that may be configured to receive the reinforcement structure 111.

When the reinforcement structure 111 is disposed between the midsole 115 and the outsole 116 (the first example as shown in FIGS. 1A-C, 2A-C, and 3), the reinforcement structure 111 may be in a relatively far position (e.g., a distance in range of approximately 12 to 16 mm) from the wearer's foot (e.g., top of the insole or footbed). That is, the reinforcement structure 111 may be located relatively close to the ground. Alternatively, when the reinforcement structure 111 is disposed between lower layer 130 and the upper layer 128 of the midsole 115 (the second example as shown in FIGS. 4A-D, 8, and 10), the reinforcement structure 111 may be in a relatively close position (e.g., a distance in the range of about 2 to about 6 mm) to the wearer's foot (e.g., top of the insole or footbed). That is, the reinforcement structure 111 may be located relatively far from the ground as compared to the first example.

By positioning the reinforcement structure 111 closer to or farther away from the wearer's foot, and thus, closer to or farther away from a natural bending axis of the foot, the area moment of inertia of the reinforcement structure 111 may be adjusted (e.g., according to a parallel axis theorem described below). In other words, the bending resistance of the reinforcement structure 111 may be controlled by where the reinforcement structure 111 is located in relation to a distance to/from the wearer's foot (e.g., with respect to the flexion bending axis and the extension bending axis of the foot).

In general, the moment of inertia of an area is a geometrical property which reflects how the area's points are distributed with regard to an arbitrary axis. The moment of inertia of the area may be calculated with respect to a reference axis, such as X or Y, that is normally a centroid or neutral axis. For standard shapes, such as a rectangle, the moment of inertia of an area may be calculated by the formula: where, B is the base (horizontal) and H is the height (vertical) of the object. In an example of a rectangular cross-section, the bending may occur about the X axis, which is a centroid axis. For more complex shapes having multiple cross-sectional areas, such as an "I-Beam," the parallel-axis theorem can be used to find the area moment of inertia. For example, an object may be divided into multiple simple cross-sectional areas. The parallel-axis theorem states the moment of inertia for an area about an axis is equal to its moment of inertia about a parallel axis passing through the area's centroid plus the product of the area and the square of the perpendicular distance between the axes. Using this theorem, the individual area moments of inertia for each of the three rectangular areas in an I-beam can be calculated with respect to one common axis of bending, and summated to determine the total area moment of inertia for the I-beam.

The parallel axis theorem indicates that as the distance of an area from the bending axis increases, its contribution to the magnitude of the area moment of inertia also increases.

Thus, when the reinforcement structure 111 is positioned closer to the foot (e.g., and the flexion bending axis of the foot), such as in the second example where the reinforcement structure is disposed in the midsole 115, then the area moment of inertia may be lower and the reinforcement structure 111 may be easier to bend (i.e., there may be less bending-resistance). Alternatively, when the reinforcement structure 111 is positioned farther away from the foot (e.g., and the flexion bending axis of the foot), such as in the first example where the reinforcement structure is disposed between the midsole 115 and the outsole 116, then the area moment of inertia may be increased. Thus, in the first example, the reinforcement structure 111 may be able to resist dorsal flexion to a greater extent, the midsole sidewalls 156 may be reinforced, and the midsole 115 may be more rigid in comparison to the second example, where the reinforcement structure is disposed in the midsole 115.

As mentioned above, in some examples, the distance $D_B$ the bridge 122 may extend within the sole assembly 106 may vary, where the distance $D_B$ may be measured generally along the longitudinal centerline $C_s$ 151 axis of the sole assembly 106 and the first axis Y of the reinforcement structure 111 from a front-most (or a most-anterior) point of the bridge 122 to a back-most (or a most-posterior) point of the bridge 122. For example, a first example distance $D_{B1}$ (FIG. 3B) the bridge 122 may extend may range from approximately 10-18% of the length $L_s$ of the sole assembly 106. For example, for an average adult male shoe size 100, the first example distance $D_{B1}$ the bridge 122 may extend may range from approximately 31-60 mm within a sole assembly 106 that may be approximately 310-330 mm long ($L_s$) measured from the front-most point to the back-most point of the sole assembly 106. For instance, the first example distance $D_{B1}$ the bridge 122 may be between 40-50 mm.

A width of the bridge 122 may be measured along the centerline CB or in a direction parallel to the centerline $C_B$. For instance, the width of the bridge 122 may be the distance between the anterior side $S_2$ of the bridge 122 and the posterior side $S_4$ of the bridge 122 as measured in direction that is substantially perpendicular to the anterior side $S_2$ and/or the posterior side $S_4$. The width of the bridge 122 may be between 30-60 mm, 40-50 mm, or 44-48 mm. The width of the bridge 122 may be between 5-18% a total length of the shoe into which the reinforcement structure 111 is incorporated.

A length of the reinforcement structure 111 may be measured along the midline $M_W$ when the reinforcement structure is in its flat or unformed state. Similarly, the length may be measured along the top surface of the reinforcement structure 111 when the reinforcement structure 111 is in its formed u-shape. The length of the reinforcement structure 111 may be measured from the medial-most point to the lateral-most point of the reinforcement structure 111. In some examples, the length may be between 3 to 5 times the width of the reinforcement structure 111.

As an illustrative example, the reinforcement structure 111 may be positioned in the sole assembly 106 such that the intersection of the centerline $C_B$ of the bridge 122 and the midline $M_W$ of the medial and lateral wings 133,144 of the reinforcement structure 111 may be located in alignment with the longitudinal centerline $C_s$ 151 of the sole assembly 106 at a distance of approximately 30-36% of the total sole assembly 106 length $L_S$ from the most-posterior point of the sole assembly 106. For instance, for an average adult male shoe size 100, the intersection of $C_B$ and $M_W$ may be located at approximately 95-115 mm from the most-posterior point of the sole assembly 106. Thus, at least the bridge 122 of the reinforcement structure 111 may be positioned at a location in the sole assembly 106 where it may extend between a range of approximately 65-145 mm from the most-posterior point of the sole assembly 106.

Figure 7:
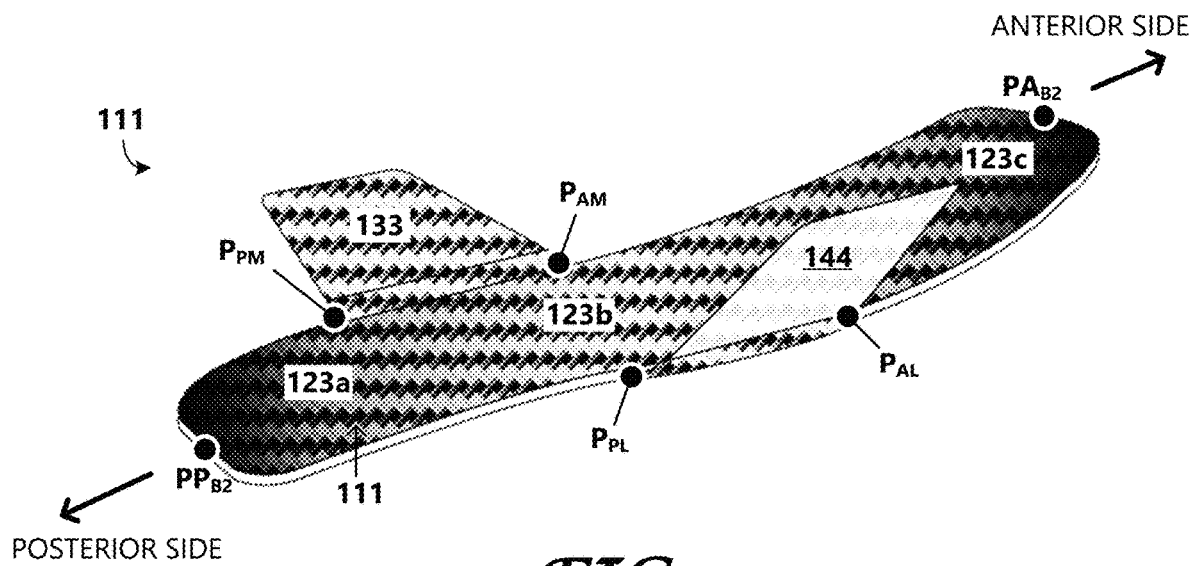
FIG. 7 depicts a perspective view of a reinforcement structure, where the bridge may be configured to extend a second example distance within the sole assembly according to an example.
Figure 8:
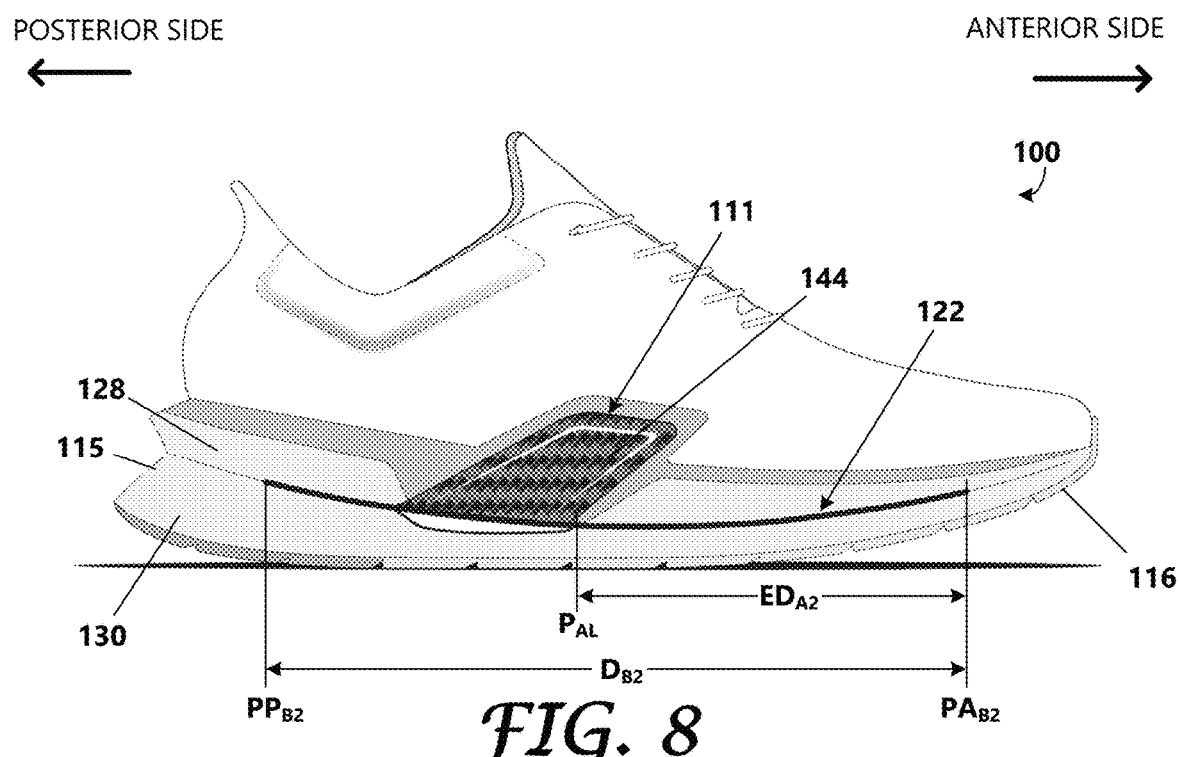
FIG. 8 depicts a lateral side view of an example shoe including the example reinforcement structure of FIG. 7.

With reference now to FIGS. 7 and 8, a second example reinforcement structure 111 is shown that may have a second example distance $D_{B2}$ the bridge 122 may extend within the sole assembly 106. The second example distance $D_{B2}$ may be greater than the first example distance $D_{B1}$. According to an example, the first example distance $D_{B1}$ may include the longitudinal length of a middle portion 123b of the bridge 122 (measured along the longitudinal centerline $C_s$151 axis from the intersecting point $P_{AL}$ of the anterior side of the lateral side wing 144 and the lateral side of the bridge 122 to the intersecting point $P_{PM}$ of the posterior side of the medial side wing 133 and the medial side of the bridge 122). For instance, the middle portion 123b may be disposed between the medial and lateral wings 133, 144, and may have a similar or approximately the same profile as the first example bridge 122 of the first example reinforcement structure 111. The posterior portion 123a may extend from the posterior side of the middle portion 123b toward the posterior side of the sole assembly 106 to a back-most point $PP_{B2}$ along the posterior side of the posterior portion 123a, and the anterior portion 123c may extend from the anterior side of the middle portion 123b toward the anterior side of the sole assembly 106 to a front-most point $PA_{B2}$ along the anterior side of the anterior portion 123c.

The second example distance $D_{B2}$ may include the first example distance $D_{B1}$, a first extended distance $ED_{P2}$ (not shown), and a second extended distance $ED_{A2}$. The first extended distance $ED_{P2}$ may include a distance a posterior portion 123a of the bridge 122 may extend in the posterior direction. According to an example, the first extended distance $ED_{P2}$ may be measured along the longitudinal centerline $C_S$ 151 axis from the back-most point of the middle portion 123b of the bridge 122 (e.g., the intersecting point $P_{PM}$ of the posterior side of the medial side wing 133 and the medial side of the bridge 122) to the back-most point $PP_{B2}$ of the bridge 122. The second extended distance $ED_{A2}$ may include a distance an anterior portion 123c of the bridge 122 may extend in the anterior direction. According to an example, the second extended distance $ED_{A2}$ may be measured along the longitudinal centerline $C_S$ 151 axis from the front-most point of the middle portion 123b of the bridge 122 (e.g., the intersecting point $P_{AL}$ of the anterior side of the lateral side wing 144 and the lateral side of the bridge 122) to the front-most point $PA_{B2}$ of the bridge 122.

In an example, the medial 133 and lateral 144 side wing dimensions and positions may be generally the same as the first example reinforcement structure 111. For instance, the second example reinforcement structure 111 may be configured and positioned such that the medial midpoint $MP_M$ of the medial side wing 133 may be located at an approximate range of 25-33% of the total sole assembly 106 length $L_S$ from the most-posterior point of the sole assembly 106 as measured along the longitudinal centerline $C_S$151 axis, and the lateral midpoint $MP_L$ of the lateral side wing 144 may be located at an approximate range of 30-36% of the total sole assembly 106 length $L_S$ from the most-posterior point of the sole assembly 106 as measured along the longitudinal centerline $C_S$ 151 axis.

According to an example, the second example distance $D_{B2}$ that the bridge 122 may extend within the sole assembly 106 may be the distance from the back-most point $PP_{B2}$ of the bridge 122 to the front-most point $PA_{B2}$ of the bridge 122 measured along the longitudinal centerline $C_S$ 151 axis. According to one example, the second example bridge 122 may be positioned so that it generally extends approximately 70-95% the length $L_S$ of the sole assembly 106. According to an illustrative example, for an average adult male shoe size 100, the second example distance $D_{B2}$ the second example reinforcement structure 111 may extend in the sole assembly 106 may range from approximately 225-255 mm.

Figure 9:
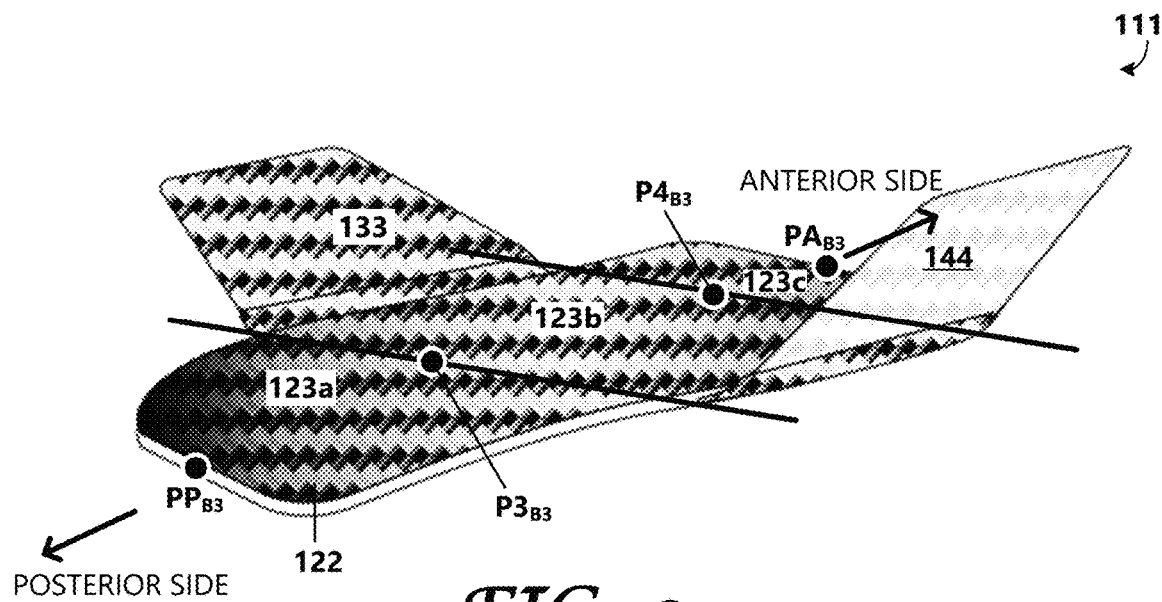
FIG. 9 depicts a perspective view of a reinforcement structure, where the bridge may be configured to extend a third example distance within the sole assembly according to an example.
Figure 10:
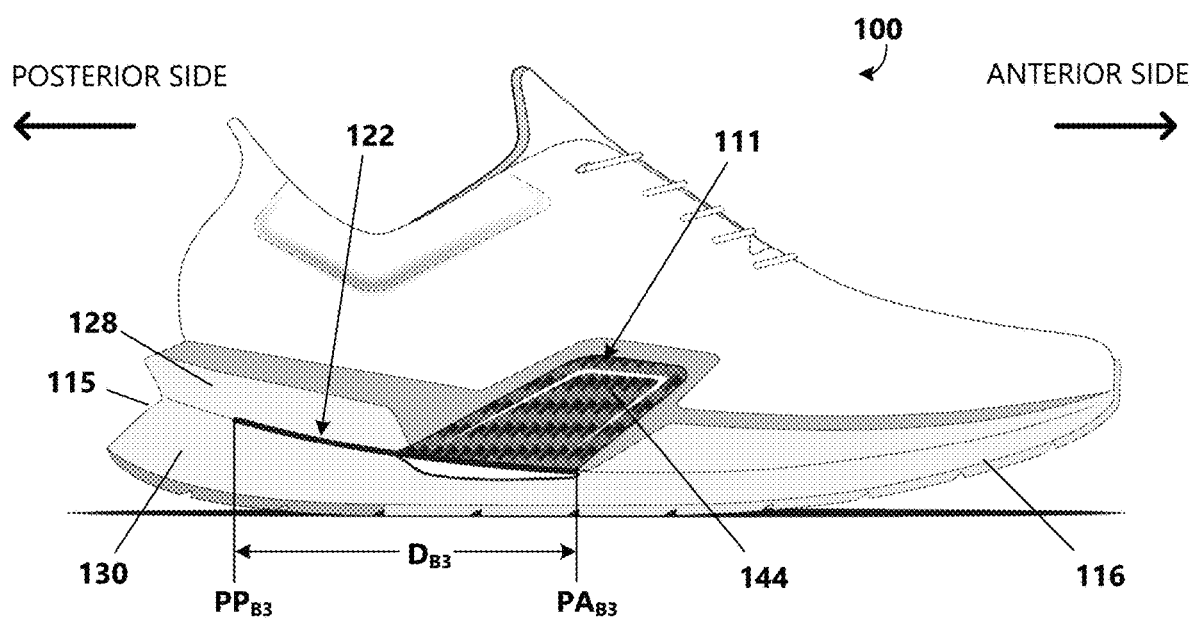
FIG. 10 depicts a lateral side view of an example shoe including the example reinforcement structure of FIG. 9.

With reference now to FIGS. 9 and 10, a third example reinforcement structure 111 is shown that may have a third example distance $D_{B3}$ the bridge 122 may extend within the sole assembly 106. The third example distance $D_{B3}$ may be greater than the first example distance $D_{B1}$ and less than the second example distance $D_{B2}$. In an example, the medial 133 and lateral 144 side wing dimensions and positions may be generally the same as the first and second example reinforcement structure 111. For instance, the third example reinforcement structure 111 may be configured and positioned such that the medial midpoint $MP_M$ of the medial side wing 133 may be located at an approximate range of 25-33% of the total sole assembly 106 length $L_S$ from the most-posterior point of the sole assembly 106 as measured along the longitudinal centerline $C_S$ 151 axis, and the lateral midpoint $MP_L$ of the lateral side wing 144 may be located at an approximate range of 30-36% of the total sole assembly 106 length $L_S$ from the most-posterior point of the sole assembly 106 as measured along the longitudinal centerline $C_S$ 151 axis.

As shown in FIG. 9, the bridge 122 of the third example reinforcement structure 111 may include a posterior portion 123a, a middle portion 123b, and an anterior portion 123c, where, similar to the second example reinforcement structure 111, the middle portion 123b may be disposed between the medial and lateral wings 133, 144, and may have a similar or approximately the same profile as the bridge 122 of the first example reinforcement structure 111. The posterior portion 123a may extend from the posterior side of the middle portion 123b toward the posterior side of the sole assembly 106 to a back-most point $PP_{B3}$ along the posterior side of the posterior portion 123a, and the anterior portion 123c may extend from an anterior side of the middle portion 123b to a front-most point $PA_{B3}$ along the anterior side of the anterior portion 123c.

The third example distance $D_{B3}$ may include the first example distance $D_{B1}$, a first extended distance $ED_{P3}$ (not shown), and a second extended distance $ED_{A3}$ (not shown). The first extended distance $ED_{P3}$ may include a distance that a posterior portion 123a of the bridge 122 may extend in the posterior direction. According to an example, the first extended distance $ED_{P3}$ may be measured along the longitudinal centerline $C_S$ 151 axis from the back-most point of the middle portion 123b of the bridge 122 (e.g., the intersecting point $P_{PM}$ of the posterior side of the medial side wing 133 and the medial side of the bridge 122) to the back-most point $PP_{B3}$ of the bridge 122. The second extended distance $ED_{A3}$ may include a distance that an anterior portion 123c of the bridge 122 may extend in the anterior direction. According to an example, the second extended distance $ED_{A3}$ may be measured along the longitudinal centerline $C_S$ 151 axis from the front-most point of the middle portion 123b of the bridge 122 (e.g., the intersecting point $P_{AL}$ of the anterior side of the lateral side wing 144 and the lateral side of the bridge 122) to the front-most point $PA_{B3}$ of the bridge 122. That is, the third example distance $D_{B3}$ may be the distance from the back-most point $PP_{B3}$ of the bridge 122 to the front-most point $PA_{B3}$ of the bridge 122 measured along the longitudinal centerline $C_S$ 151 axis. According to one example, the third example bridge 122 may be positioned so that it generally extends approximately 25-70% the length $L_S$ of the sole assembly 106. According to an illustrative example, for an average adult male shoe size 100, the third example distance $D_{B3}$ the third example reinforcement structure 111 may extend in the sole assembly 106 may range from approximately 60-125 mm.

According to an aspect, rigidity and torsional stability versus forefoot flex of the midsole 115 may be inversely affected relative to the distance $D_B$ the reinforcement structure bridge 122 may extend within the sole assembly 106. For example, the first example bridge 122, such as in the examples shown in FIGS. 1A-C, 2A-C, 3A-C, and 5A, may provide a first rigidity level, a first torsional stability level, and a first forefoot flex level. The second example bridge 122, such as in the examples shown in FIGS. 7 and 8, may extend farther within the sole assembly 106, and thus, may have a higher rigidity level and torsional stability level, but a lower forefoot flex level than the first example bridge 122.

In some examples, the varying levels of rigidity, torsional stability, and forefoot flex that can be achieved through variation of the dimensions of the bridge 122 of the reinforcement structure 111 may be considered when determining placement of the reinforcement structure 111 in the shoe 100, or vice versa. For example, as described above, positioning the reinforcement structure 111 between the midsole 115 and outsole 116, which is farther away from the golfer's foot than if the reinforcement structure 111 were disposed between the upper 128 and lower 130 layers of the midsole 115, may increase rigidity and torsional stability. Alternatively, disposing the reinforcement structure 111 between the upper 128 and lower 130 layers of the midsole 115 may increase forefoot flex, but decrease rigidity and torsional stability. Accordingly, in some examples, different sizes of bridges 122 may be used based on placement of the reinforcement structure 111 in the shoe 100 to achieve one or a combination of a desired rigidity level, torsional stability level, and forefoot flex.

According to an aspect, along with traction, the sole assembly 106 of the golf shoe 100 may provide stability and comfort for the wearer's foot. For instance, many golf courses offer golfers the choice of driving an electric-powered cart over or walking the course. Some golfers prefer to walk the entire course. Even golfers, who prefer to drive carts, will walk a considerable distance during their round of play. Depending upon the length of the course, speed of play, and other factors, a golfer may walk a few miles in a round. Thus, a golf shoe 100 needs to be comfortable to wear and allow a golfer to walk naturally and freely. That is, the shoe 100 needs to support the foot and yet it also needs to be flexible. The golfer must be able to address the ball, make a swing, walk comfortably on the course, and do other golf-specific actions such as crouching down to line-up a putt.

Two directions of foot movement that may be considered in relation to various golf movement: include dorsiflexion and plantar flexion. In general, dorsiflexion is the action of raising the foot upwards toward the shin. That is, the foot is flexing in the dorsal or upward direction. The muscles and tendons located in the front of the foot and leg that are passed into the ankle joint are used to move the foot in the dorsiflexion direction. In general, the foot moves upwards in the range of about 10 to about 30 degrees. On the other hand, plantar flexion is the action of moving the foot in a downward direction towards the ground. The muscles and tendons located in the back and inside of the foot and leg that are passed into the ankle joint are used to move the foot in the plantar flexion direction. In general, the foot moves upwards in the range of about 20 to about 50 degrees.

According to an example, a walking cycle may include various stages that each foot may undergo. A first stage, which may be referred to as a heel strike phase, may begin when the heel first touches the ground, and may last until the whole foot is on the ground. For example, the golfer may slightly dorsiflex the foot, and the heel may strike the ground surface first as the golfer starts their walking gait. Accordingly, as the golfer is walking, the heel area of the outsole 116 of the sole assembly 106, corresponding to the heel region of the golfer's foot as described above, may contact the ground.

A second stage of the walking cycle, which may be referred to as an early flatfoot stage, may begin when the person's whole foot is on the ground as the golfer transfers their weight from the heel to the toes. For example, the golfer's arch may be flattened and the foot may serve as a shock absorber, helping to cushion the force of the golfer's body weight as the foot presses downwardly. As described above, the midsole 115 may comprise an upper layer 128 and a lower layer 130, where the upper layer 128 may be made of a relatively soft and flexible material, and the lower layer 130 may be made of a relatively firm material. Accordingly, the midsole 115 of the shoe 100 may provide the golfer comfort serving as a shock absorber to help cushion the force of the golfer's body weight as the foot presses downwardly. The end of the early flatfoot stage may occur when the golfer's center of gravity passes over top of the foot.

A third stage of the walking cycle, which may be referred to as a late flatfoot stage, may begin when the golfer's center of gravity has passed the neutral position. The late flatfoot stage may end when the golfer's heel (e.g., and the heel area of the outsole 116) lifts off the ground. During the late flatfoot phase, the foot may shift from serving as a flexible shock absorber to acting as a rigid lever that can serve to propel the golfer forward. Accordingly, both a level of comfort and a level of rigidity in the sole assembly 106 of the shoe 100 may be desired.

In a fourth stage, which may be referred to as a heel rise stage, may begin when the golfer's heel (e.g., and the heel area of the outsole 116) begins to leave the ground. For example, the golfer's foot may plantarflex, and the golfer's foot may function as a rigid lever to move the body forward. During this phase of walking, the forces that go through the foot may be increased (e.g., 2-3 times the person's body weight) due to the foot creating a lever arm (centered on the ankle), which may magnify body weight forces. Accordingly, both a level of comfort, a level of rigidity, and additionally, a level of forefoot flex in the sole assembly 106 of the shoe 100 may be desired.

In a fifth and last stage of the stance phase may be referred to as a toe off stage. The toe off stage may begin as the golfer's toes, and thus the shoe 100, leaves the ground. For example, the foot may continue to plantarflex and push off the ground until the golfer's foot is in the air. According to an aspect, the sole assembly 106 of the golf shoe 100 of the present disclosure may have various benefits and advantageous features. In one example, the sole assembly 106 may provide good comfort and stability, and yet also provide good forefoot flexibility so the golfer can perform his/her natural walking actions easily and comfortably.

When walking and playing golf, there may be other numerous and varied forces acting on the foot and the different parts of the shoe 100. For example, downward and upward forces can act on the midsole 115 during a golf swing. For example, during normal golf play, a golfer may make shots with a wide variety of clubs. As the golfer swings a club when making a shot and transfers their weight, their foot and shoe 100 may absorb tremendous forces. For example, when a right-handed golfer is first planting their feet before beginning a club swinging motion (e.g., when addressing the ball), their weight may be evenly distributed between their lead and trail feet. As the golfer begins their backswing, their weight may shift primarily to their trail foot. Significant pressure may be applied to the trail foot at the beginning of the downswing as the golfer drives power off of the trail foot to generate increased swing speeds. As the golfer follows through with their swing and drives the ball, their weight may be transferred from the trail foot to the lead foot. During the swinging motion, there may be some pivoting at the trail and lead feet, but this pivoting motion may be controlled and not substantially move or slip when making the shot. Thus, it may be important that the shoes 100 provide good stability during the golf swing. The golfer may need a stable platform so that they can maintain their balance as they perform their swinging action. Good foot traction may also be important during the golf shot cycle.

Additionally, as the golfer makes their backswing, the right foot presses down on the medial forefoot and heel regions, and, as the right knee remains tucked in, the right foot creates torque with the ground to resist external foot rotation. Following through on a shot, the golfer's lead shoe rolls from the medial side (inside) of their lead foot toward the lateral side (outside) of the front foot. Meanwhile, their trail shoe may simultaneously flex to the forefoot and internally rotate as the heel lifts.

In some examples, the forces acting on the midsole 115 during a golf swing may increase relative to swing speed. Thus, some golfers, such as more experienced tour players, who may have golf wings that range in speed from 100-120 miles per hour, may need increased stability from a shoe midsole 115 to help support these additional forces.

One drawback with some athletic golf shoes is these shoes may help provide the golfer with good cushioning, forefoot flex, and other comfort characteristics; however, there may be a loss in rigidity of the midsole 115, which may not provide a stable platform for the golfer when he/she maker their swing. For example, a softer midsole 115 may decrease the amount of support to prevent collapse of the shoe's suspension during a golf swing. Thus, the sole assembly 106 of the present disclosure includes aspects that can provide a high level of flexibility and yet also provide high stability. A sole assembly 106 comprising the reinforcement structure 111 mentioned above may help provide additional stability. For example, the reinforcement structure 111 may aid the shoe 100 in being able to hold and support the medial and lateral sides of the golfer's foot as they shift their weight while making a golf shot. Thus, the golfer can stay balanced as the follow through the complete swinging motion of the club. According to an example, the reinforcement structure 111 may further provide greater bending stiffness in the midfoot area 142 of the sole assembly 106. In an example, the reinforcement structure 111 may help provide the shoe 100 with additional mechanical strength and structural integrity and does not allow excessive twisting or turning of the shoe. Thus, the shoe 100 may provide improved torsional stability. At the same time, the shoe 100 may have retain forefoot flexibility so the golfer is able to walk and play the course and engage in other golf activities comfortably.

In some examples, the asymmetry of the reinforcement structure's U-shape (i.e., the lateral side wing 144 angled ($A_L$) toward the midfoot area 142 and the medial side wing 133 angled ($A_M$) toward the rearfoot area 140) may further help to naturally align the golfer's swing, and which may help to promote a natural transition to the golfer's driving foot during push off and follow through. In another example, the reinforcement structure 111 may be designed to deform when the golfer shifts their weight, such as onto and off of the driving foot. In some examples, after the downswing and follow through, the elastic potential energy that may be stored as a result of applying force to deform the reinforcement structure 111 may be released as the golfer pushes off the driving foot and the reinforcement structure 111 may spring back to its original shape.

Figure 11:
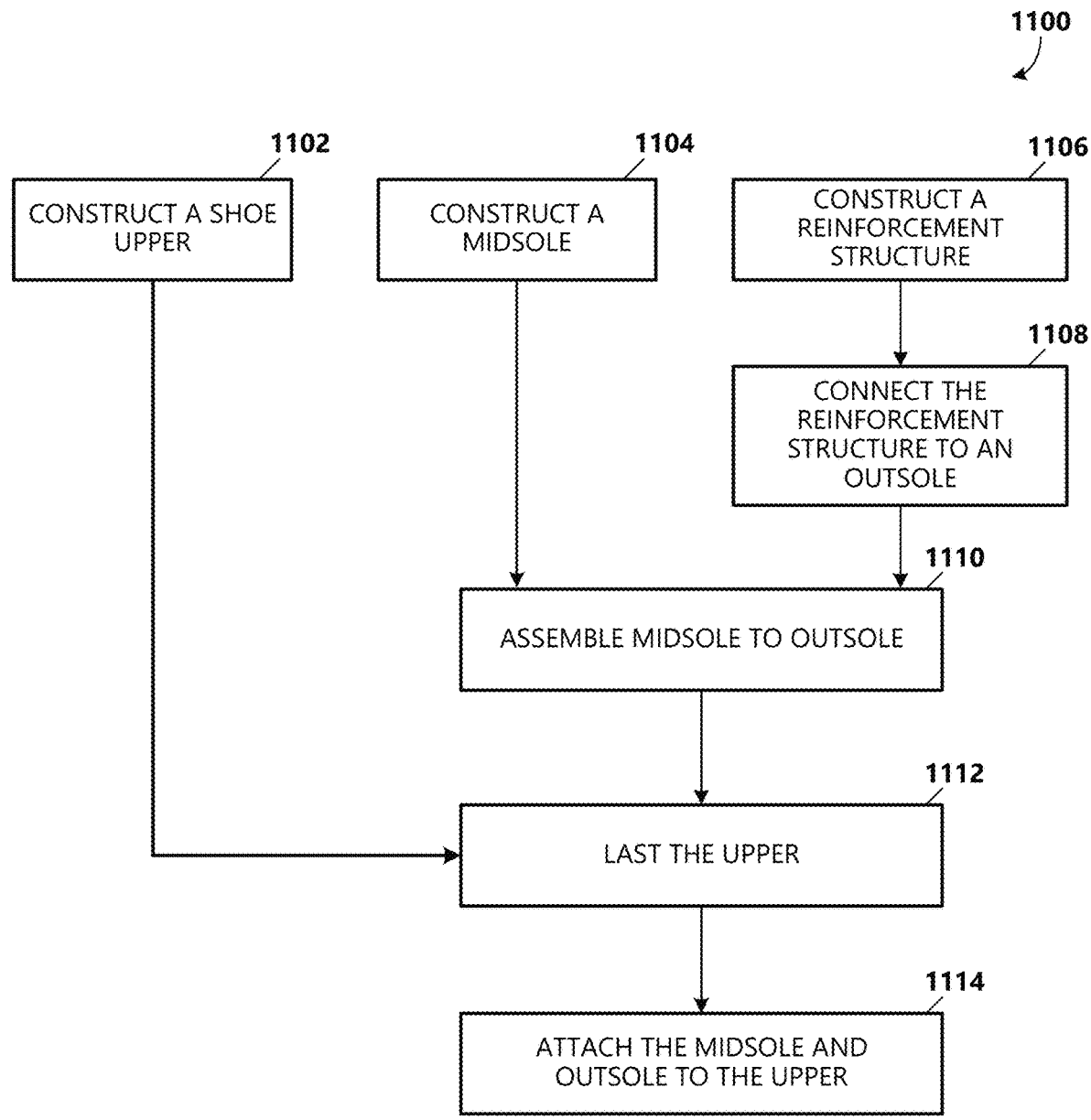
FIG. 11 depicts example operations of a method of making a golf shoe comprising a reinforcement structure according to an embodiment.

FIG. 11 depicts a flow chart having example operations of a method 1100 of making a golf shoe 100 comprising a reinforcement structure 111 according to an embodiment. At OPERATION 1102, an upper 104 may be constructed. As described above, the upper 104 may generally comprise a vamp 108 connected to a quarter 102. In some examples, the upper 104 may further comprise an instep region 117 including a tongue member and, in some examples, an eye stay. In some examples, the quarter 102 may include a heel cup 103. Further, a collar 118 may be defined around an opening 114 for inserting a foot. In some examples, the various parts of the upper 104 may be stitched, glued, or otherwise attached together.

At OPERATION 1104, a midsole may be constructed. According to an example, the midsole 115 may comprise an upper layer 128 and a lower layer 130 formed of different materials or of materials with different densities. In one example, a first material may be placed inside a first mold (e.g., EVA mold) and molded into the upper layer 128, which may then be molded together with a second material in a second (EVA) mold to form a dual-density midsole 115.

At OPERATION 1106, a reinforcement structure 111 may be constructed. For example, the reinforcement structure 111 may be constructed of any suitable reinforcing material such as a carbon composite material, fiberglass composite material, TPU composite material, or other material that may provide additional structural rigidity to the shoe 100. The material may be cut into a desired shape (e.g., parallel shape, parallel shape with an extended bridge 122) and molded into a general U shape to form the reinforcement structure 111. An example method for molding the reinforcement structure 111 with the outsole 116 is described below with reference to the left-hand path illustrated in FIG. 13.

At OPERATION 1108, the reinforcement structure 111 may be connected to an outsole 116. According to an example, the reinforcement structure 111 may be placed inside a third mold (e.g., a TPU mold), where resin (TPU) may flow around the reinforcement structure 111 to create a more rigid structure and connect the reinforcement structure 111 to the outsole 116.

At OPERATION 1110, this reinforcement structure 111 and outsole 116 assembly may be assembled to the midsole 115 that was constructed at OPERATION 1104. For example, the bottom surface of the lower layer 130 of the midsole 115 may be bonded to the top surface of the outsole 116 using adhesives or other attachment techniques.

At OPERATION 1112, the upper 104 constructed at OPERATION 1102 may be lasted, and at OPERATION 1114, the sole assembly 106 may be attached to the upper 104. For example, the board may be bonded to the top surface of the upper layer 128 of the midsole 115, and in some examples, an insole may be inserted into the shoe 100. In some examples, additional steps may be performed at one or more of the above operations to waterproof the shoe 100, inspect the shoe 100, and/or perform other shoe assembly tasks.

Figure 12:
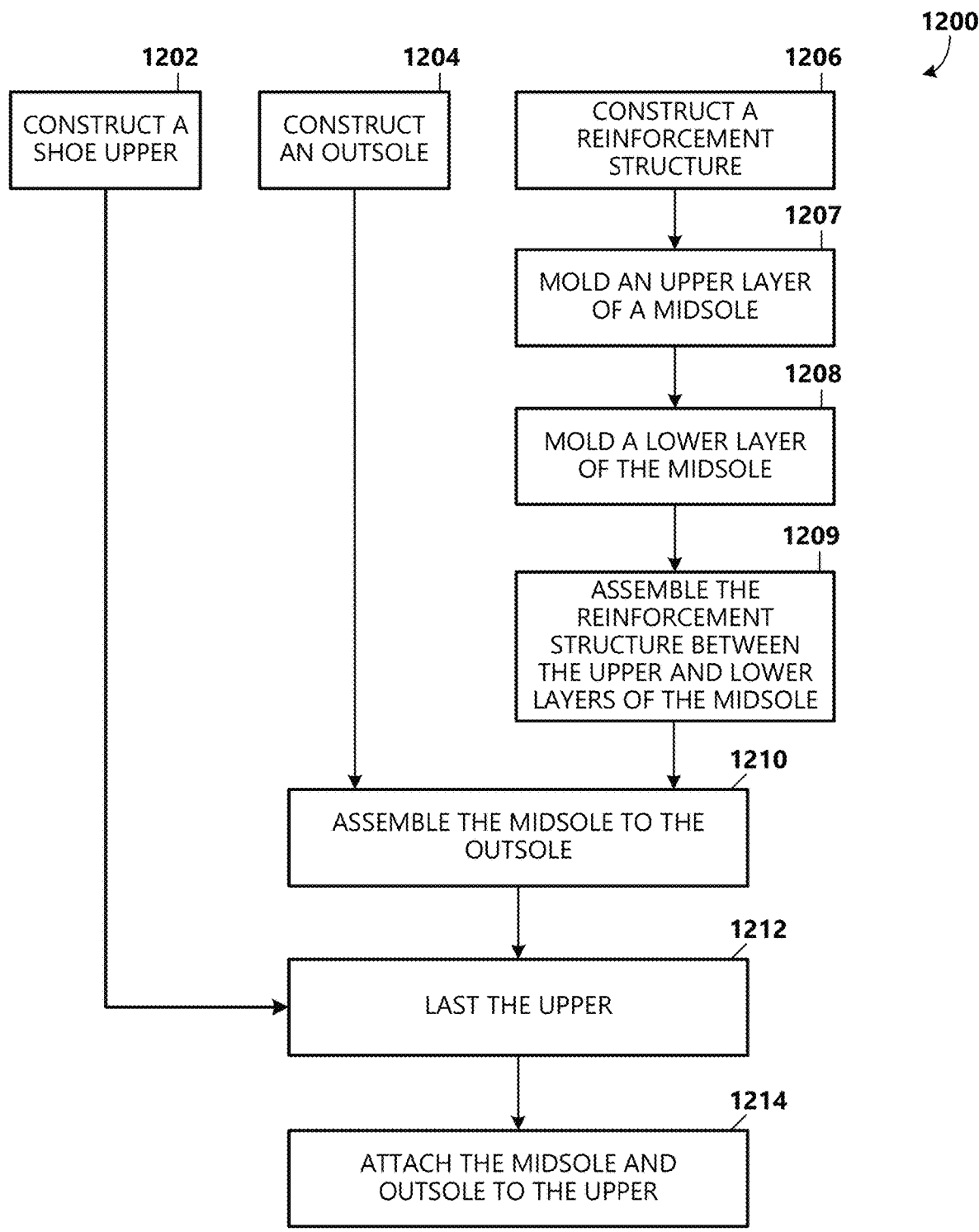
FIG. 12 depicts example operations of a method of making a golf shoe comprising a reinforcement structure according to another embodiment.

With reference now to FIG. 12, a flow chart is illustrated having example operations of a method 1200 of making a golf shoe 100 comprising a reinforcement structure 111 according to another embodiment. For example, the method 1100 described above with reference to FIG. 11 describes a method of making a shoe 100 including a reinforcement structure 111 connected to the outsole 116. The method 1200 described now with reference to FIG. 12 describes a method of making a shoe 100 including a reinforcement structure 111 molded inside the midsole 115.

At OPERATION 1202, an upper 104 may be constructed. OPERATION 1202 may be performed similarly to OPERATION 1102 described in FIG. 11. In some examples, the various parts of the upper 104 may be stitched, glued, or otherwise attached together.

At OPERATION 1204, an outsole 116 may be constructed. For example, a TPU mold may be used to form the outsole 116.

At OPERATION 1206, the reinforcement structure 111 may be constructed. For example, the reinforcement structure 111 may be constructed of any suitable reinforcing material such as a carbon composite material, fiberglass composite material, TPU composite material, or other material that may provide additional structural rigidity to the shoe 100. The material may be cut into a desired shape and molded into a general U shape to form the reinforcement structure 111. An example method for molding the reinforcement structure 111 inside the midsole 115 is described below with reference to the right-hand path illustrated in FIG. 13.

At OPERATION 1207, a first layer of a dual-density midsole 115 may be formed. According to an example, the midsole 115 may comprise an upper layer 128 and a lower layer 130 formed of different materials or of materials with different densities. At OPERATION 1207, a first material may be placed inside a first mold (e.g., EVA mold) and molded into the upper layer 128. In an example, a bottom side of the upper layer 128 may be formed to include a nesting area for the reinforcement structure 111.

At OPERATION 1208, the second layer of the dual-density midsole 115 may be formed. For example, a second material, or the first material having a higher density than the first material used in the first layer, may be placed inside a second (EVA) mold to form the lower layer 130. In an example, a top side of the bottom layer 130 may be formed to include a nesting area for the reinforcement structure 111.

At OPERATION 1209, the reinforcement structure 111 may be assembled between the upper layer 128 and the lower layer 130 of the midsole 115. In some examples, one or more buffing, gluing/cementing and ultraviolet (UV)/heat glue activations may be included in assembling the reinforcement structure 111 between the upper layer 128 and the lower layer 130 of the midsole 115. Additionally, in some examples, a jig or press may be used to force the final assembly together for bonding and cooling.

At OPERATION 1210, the dual-density midsole 115 with the reinforcement structure 111 may be attached to the outsole 116 constructed at OPERATION 1204. For example, the bottom surface of the lower layer 130 of the midsole 115 may be bonded to the top surface of the outsole 116 using adhesives or other attachment techniques.

At OPERATION 1212, the upper 104 constructed at OPERATION 1202 may be lasted.

At OPERATION 1214, the sole assembly 106 may be attached to the upper 104. For example, the board may be bonded to the top surface of the upper layer 128 of the midsole 115, and in some examples, an insole may be inserted into the shoe 100. In some examples, additional steps may be performed at one or more of the above operations to waterproof the shoe 100, inspect the shoe 100, and/or perform other shoe assembly tasks.

Figure 13:
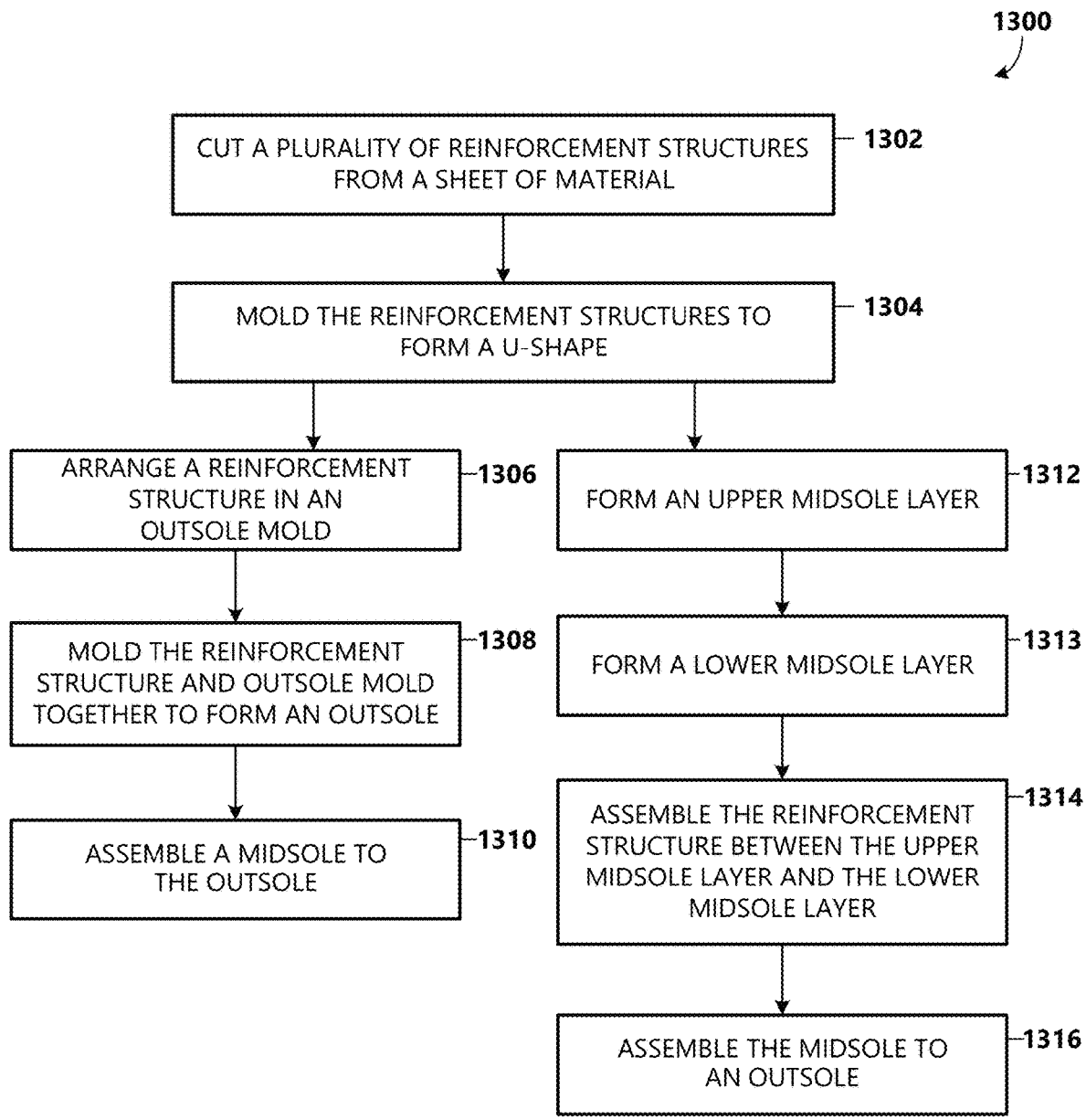
FIG. 13 depicts example operations of a method of constructing a sole comprising a reinforcement structure according to an embodiment.

With reference now to FIG. 13, an example method 1300 is provided for assembling a sole assembly 106 according to an embodiment. At OPERATION 1302, a plurality of reinforcement structures 111 may be cut from a sheet 164 of material, such as was illustrated in FIG. 6. For example, the material may be a carbon composite material, fiberglass composite material, TPU composite material, or other material that may provide additional structural rigidity to the shoe 100. The material may be cut into a desired shape using standard manufacturing cutting methods, such as a water jet, laser jet, die cut, etc. The size of the shape may be dependent on different shoe 100 sizes and/or different reinforcement structure configurations. According to an example, the desired shape may include a parallelogram shape for creating a reinforcement structure 111 that has a bridge 122 that may extend a first example distance $D_{B1}$ within the sole assembly 106. In other examples, the desired shape may include the parallelogram shape in addition to an anterior bridge portion 123c and a posterior bridge portion 123a, where the bridge 122 may extend a second or third example distance $D_{B2}, D_{B3}$ within the sole assembly 106.

At OPERATION 1304, the shapes may be molded into a general U shape having one of various bridge widths to form a plurality of reinforcement structures 111. The method 1300 may take a left-hand path to OPERATION 1306 for molding the reinforcement structure 111 with the outsole 116, or alternatively, the method 1300 may take a right-hand path to OPERATION 1312 for molding the reinforcement structure 111 inside the midsole.

Following the left-hand path, at OPERATION 1306, the reinforcement structure 111 may be placed inside a mold (e.g., a TPU mold), and at OPERATION 1308, resin (TPU) may be injected inside the mold, where the resin may flow around the reinforcement structure 111 to form a more rigid structure and connect the reinforcement structure 111 to the outsole 116.

At OPERATION 1310, the bottom surface 131 of the lower layer 130 of the midsole 115 may be bonded to the top surface of the outsole 116 to form a sole assembly 106 comprising the reinforcement structure 111. For example, the midsole 115 and outsole 116 may be bonded together using adhesives or other attachment techniques.

Following the right-hand path from OPERATION 1304, at OPERATION 1312, the upper layer 128 of the midsole 115 may be formed from a relatively soft first EVA foam composition having a first hardness level (durometer). At OPERATION 1313, the lower layer 130 of the midsole 115 may be formed from a relatively firm material, such as a second EVA foam composition having a second hardness level (durometer).

At OPERATION 1314, the reinforcement structure 111 may be assembled between the upper layer 128 and the lower layer 130 of the midsole 115. In some examples, one or more buffing, gluing/cementing and ultraviolet (UV)/heat glue activations may be included in assembling the reinforcement structure 111 between the upper layer 128 and the lower layer 130 of the midsole 115. Additionally, in some examples, a jig or press may be used to force the final assembly together for bonding and cooling.

At OPERATION 1316, the dual-density midsole 115 with the reinforcement structure 111 may be attached to an outsole 116. For example, the bottom surface of the lower layer 130 of the midsole 115 may be bonded to the top surface of the outsole 116 using adhesives or other attachment techniques, and a sole assembly 106 comprising the reinforcement structure 111 may be constructed. The resulting sole assembly 106 may have an optimum combination of structural rigidity and flexibility. For example, a shoe 100 with a sole assembly 106 comprising the reinforcement structure 111 may be able to hold and support the medial and lateral sides of the golfer's foot as they shift their weight while making a golf shot. The shoes 100 help provide the golfer with a stable platform that does not collapse under loads that may be created from the golfer's swing. The shoes 100 may provide high structural support to the golfer, and yet they do not sacrifice flexibility, and other golf-performance properties. Thus, the golfer can walk and play the course and engage in other golf activities comfortably.

When numerical lower limits and numerical upper limits are set forth herein, it is contemplated that any combination of these values may be used. Other than in the operating examples, or unless otherwise expressly specified, all of the numerical ranges, amounts, values and percentages such as those for amounts of materials and others in the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present technology.

It also should be understood the terms, "first", "second", "third", "fourth", "fifth", "sixth", "seventh", "eight", "ninth", "tenth", "eleventh", "twelfth", "top", "bottom", "upper", "lower", "upwardly", "downwardly", "right", "left", "center", "middle", "proximal", "distal", "anterior", "posterior", "forefoot", "mid-foot", and "rear-foot", and the like are arbitrary terms used to refer to one position of an element based on one perspective and should not be construed as limiting the scope of the technology.

All patents, publications, test procedures, and other references cited herein, including priority documents, are fully incorporated by reference to the extent such disclosure is not inconsistent with this technology and for all jurisdictions in which such incorporation is permitted. It is understood that the shoe materials, designs, constructions, and structures; shoe components; and shoe assemblies and sub-assemblies described and illustrated herein represent only some embodiments of the technology. It is appreciated by those skilled in the art that various changes and additions can be made to such products and materials without departing from the spirit and scope of this invention. It is intended that all such embodiments be covered by the appended claims.

What is claimed is:

1. A golf shoe, comprising:
   an upper; and
   a sole assembly connected to the upper, the sole assembly comprising:
   a midsole;
   an outsole; and
   a reinforcement structure provided between the midsole and the outsole to enhance a stiffness and a rigidity of the sole assembly,
   wherein the reinforcement structure has a parallelogram shape when in a flat state,
   wherein the reinforcement structure is bent along a medial form line to form a medial wing extending across a medial side of the sole assembly,
   wherein the reinforcement structure is bent along a lateral form line to form a lateral wing extending across a lateral side of the sole assembly, and
   wherein the reinforcement structure comprises a bridge section extending between and connecting the medial wing and the lateral wing, wherein a longitudinal centerline of the bridge section is angularly offset from a longitudinal centerline of the sole assembly.

2. The golf shoe of claim 1, wherein the parallelogram shape has a first side corresponding to a top edge of the medial wing, a second side corresponding to an anterior facing edge of the bridge section, a third side corresponding to a top edge of the lateral wing, and a fourth side corresponding to a posterior facing edge of the bridge section.

3. The golf shoe of claim 1, wherein the longitudinal centerline of the bridge section deviates from the longitudinal centerline of the sole assembly by at least about 5 degrees to about 25 degrees.

4. The golf shoe of claim 1, wherein the medial form line and the lateral form line are parallel to the longitudinal centerline of the sole assembly.

5. The golf shoe of claim 1, wherein the medial form line corresponds to a region between a medial side of the bridge section and a lower edge of the medial wing, and wherein the lateral form line corresponds to a region between a lateral side of the bridge section and a lower edge of the lateral wing.

6. The golf shoe of claim 1, wherein the medial wing is configured to extend across the medial side of the sole assembly in a first direction, and wherein the lateral wing is configured to extend across the lateral side of the sole assembly in a second direction that is different than the first direction.

7. The golf shoe of claim 1, wherein the medial wing is configured to extend rearward when the reinforcement structure is bent along the medial form line, and wherein the lateral wing is configured to extend forward when the reinforcement structure is bent along the lateral form line.

8. The golf shoe of claim 1, wherein the medial wing or the lateral wing is disposed at a predetermined angle relative to the bridge section when the reinforcement structure is bent along the medial form line or the lateral form line, wherein said predetermined angle is greater than 90 degrees and less than or equal to about 110 degrees.

9. The golf shoe of claim 1, wherein the medial wing and the lateral wing have at least one of a same height, length, or width.

10. The golf shoe of claim 1, wherein the medial wing has at least one of a different height, length, or width than the lateral wing.

11. The golf shoe of claim 1, wherein the reinforcement structure is asymmetrical with respect to the longitudinal centerline of the sole assembly.

12. The golf shoe of claim 1, wherein the reinforcement structure is U-shaped to enhance the stiffness and the rigidity of the sole assembly while preserving a forefoot flexibility of the sole assembly.

13. The golf shoe of claim 1, wherein the reinforcement structure is configured to deform under load and spring back to its original shape when said load is released.

14. The golf shoe of claim 1, wherein the outsole comprises a medial extension configured to extend upwards and over the medial wing so that the medial wing is disposed between the medial extension of the outsole and a medial side of the midsole.

15. The golf shoe of claim 1, wherein the outsole comprises a lateral extension configured to extend upwards and over the lateral wing so that the lateral wing is disposed between the lateral extension of the outsole and a lateral side of the midsole.

16. The golf shoe of claim 1, wherein the outsole comprises one or more openings configured to expose a portion of the sole assembly.

17. The golf shoe of claim 16, wherein the one or more openings comprise a first opening configured to expose a portion of the reinforcement structure.

18. The golf shoe of claim 17, wherein the one or more openings comprise a second opening configured to expose at least one of the medial wing or a portion of the bridge section.

19. The golf shoe of claim 18, wherein the one or more openings comprise a third opening configured to expose the lateral wing and/or another portion of the bridge section.

20. The golf shoe of claim 1, wherein the reinforcement structure is shaped and positioned so that the bridge section extends a distance within a range of 10% to 18% of a total length of the sole assembly relative to the longitudinal centerline of the sole assembly.

* * * * *